US012793236B2

(12) United States Patent
Marty et al.

(10) Patent No.: US 12,793,236 B2
(45) Date of Patent: Nov. 10, 2026

(54) SYSTEMS AND METHODS FOR MONITORING OBJECTS AT SPORTING EVENTS

(71) Applicant: Pillar Vision, Inc., Menlo Park, CA (US)

(72) Inventors: Alan W. Marty, Menlo Park, CA (US); John Carter, Elkmont, AL (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 17/899,378

(22) Filed: Aug. 30, 2022

(65) Prior Publication Data

US 2022/0415048 A1 Dec. 29, 2022

Related U.S. Application Data

(63) Continuation of application No. 17/682,726, filed on Feb. 28, 2022, now Pat. No. 11,450,106, which is a (Continued)

(51) Int. Cl.

*H01L 29/94* (2006.01)
*A63B 24/00* (2006.01)
(Continued)

(52) U.S. Cl.

CPC .......... *G06T 7/246* (2017.01); *A63B 24/0006* (2013.01); *G06V 20/13* (2022.01); (Continued)

(58) Field of Classification Search

CPC ............ A63B 69/00; A63B 2069/0006; A63B 2069/0008; A63B 69/0015; (Continued)

(56) References Cited

U.S. PATENT DOCUMENTS 8,267,781 B2 9/2012 Geiss
8,617,008 B2 12/2013 Marty et al.
(Continued)

FOREIGN PATENT DOCUMENTS

WO 2015200209 A1 12/2015

OTHER PUBLICATIONS

Anthony Domanico, "Nixie lets you wear a selfie-taking drone on your wrist," www.cnet.com/news/nixie-wear-a-selfie-taking-drone-on-your-wrist., Sep. 26, 2014, p. 1-4.
(Continued)

*Primary Examiner* — Joseph Suh
(74) *Attorney, Agent, or Firm* — .Butler Snow, LLP; Jon E. Holland

(57) ABSTRACT

A system for monitoring objects at sporting events or other types of events uses a wearable drone that has at least one camera or other sensor for capturing or otherwise sensing data. When the drone is to be used for monitoring, such as monitoring an object at a sporting event, the wearable drone may be detached from its user, and it may hover or otherwise fly within a certain position of an object to be monitored. While flying, the drone's sensor may be used to capture information, such as performance data or images, of the object during the sporting event.

39 Claims, 14 Drawing Sheets

Related U.S. Application Data continuation of application No. 15/438,289, filed on Feb. 21, 2017, now Pat. No. 11,263,461, which is a continuation-in-part of application No. 14/874,555, filed on Oct. 5, 2015, now Pat. No. 9,734,405.

(60) Provisional application No. 62/297,528, filed on Feb. 19, 2016.

(51) Int. Cl.

| | |
|---|---|
| ***G06T 7/246*** | (2017.01) |
| ***G06V 20/13*** | (2022.01) |
| ***G06V 20/17*** | (2022.01) |
| ***G06V 20/40*** | (2022.01) |
| ***H04N 7/18*** | (2006.01) |
| ***H04N 23/63*** | (2023.01) |
| ***H04N 23/698*** | (2023.01) |
| ***H04N 23/90*** | (2023.01) |

(52) U.S. Cl.

CPC .............. *G06V 20/17* (2022.01); *G06V 20/42* (2022.01); *H04N 7/183* (2013.01); *H04N 23/63* (2023.01); *H04N 23/698* (2023.01); *H04N 23/90* (2023.01); *A63B 2220/807* (2013.01); *A63B 2220/836* (2013.01); *G06T 2200/04* (2013.01); *G06T 2207/10016* (2013.01); *G06T 2207/10024* (2013.01); *G06T 2207/10028* (2013.01); *G06T 2207/30196* (2013.01); *G06T 2207/30221* (2013.01); *G06T 2207/30224* (2013.01); *G06T 2207/30228* (2013.01); *G06T 2207/30241* (2013.01)

(58) Field of Classification Search

CPC .............. A63B 69/0017; A63B 69/002; A63B 69/0024; A63B 69/0026; A63B 69/0046; A63B 24/0006; A63B 2220/807; A63B 2220/836; B63B 69/0002; G06T 7/246; G06T 2200/04; G06T 2207/10016; G06T 2207/10024; G06T 2207/10028; G06T 2207/30196; G06T 2207/30221; G06T 2207/30224; G06T 2207/30228; G06T 2207/30241; G06V 20/13; G06V 20/17; G06V 20/42; H04N 7/183; H04N 23/63; H04N 23/698; H04N 23/90; G05D 1/0094

See application file for complete search history.

(56) References Cited

U.S. PATENT DOCUMENTS 8,622,832 B2 1/2014 Marty et al.
8,638,367 B1 1/2014 Allen
8,908,922 B2 12/2014 Marty
8,948,457 B2 2/2015 Marty et al.
8,988,432 B2 3/2015 Mathe et al.
9,734,405 B2 8/2017 Marty et al.
11,134,044 B1 * 9/2021 Johansson ............... H04L 51/18
11,263,461 B2 3/2022 Marty et al.
2002/0041284 A1 * 4/2002 Konishi .................. G06T 13/00 345/473
2003/0108099 A1 * 6/2003 Nagumo ................... G06T 9/20 375/E7.199
2003/0182076 A1 9/2003 Udomkesmalee
2003/0231769 A1 * 12/2003 Bolle .................... H04L 9/0847 380/210
2005/0143199 A1 * 6/2005 Saroyan ............. A63B 71/0605 473/438
2007/0002039 A1 1/2007 Pendleton
2007/0160291 A1 * 7/2007 Takahashi .............. G06V 20/56 382/181
2008/0312010 A1 12/2008 Marty et al.
2009/0061971 A1 * 3/2009 Weitzner ............ A63B 24/0021 463/2
2009/0298588 A1 * 12/2009 Gopinath ........... A63B 71/0605 463/36
2010/0030350 A1 * 2/2010 House .................... G06V 20/40 700/91
2010/0097443 A1 * 4/2010 Lablans ................. H04N 25/40 348/E7.001
2010/0134614 A1 * 6/2010 Aman ................ A63B 24/0003 348/157
2010/0210975 A1 8/2010 Anthony
2011/0221692 A1 * 9/2011 Seydoux ................ A63H 30/04 345/173
2011/0288696 A1 * 11/2011 Lefebure ................ A63H 27/12 701/2
2012/0254369 A1 * 10/2012 Gillard ............... H04N 21/4622 709/219
2013/0002903 A1 * 1/2013 Manico .................. H04N 23/66 348/222.1
2013/0176423 A1 * 7/2013 Rischmuller .......... A63H 27/12 348/114
2013/0274635 A1 * 10/2013 Coza ...................... G16H 20/30 600/595
2014/0135956 A1 * 5/2014 Thurman ............ A63B 69/002 700/91
2014/0240336 A1 * 8/2014 Sako ......................... G06T 5/00 345/581
2014/0254867 A1 9/2014 Hoof
2014/0254896 A1 * 9/2014 Zhou .................. G06Q 20/3829 705/16
2014/0267775 A1 * 9/2014 Lablans .................. G06T 7/246 348/169
2014/0300687 A1 * 10/2014 Gillard .................... G06T 15/20 348/36
2015/0134143 A1 * 5/2015 Willenborg .......... G05D 1/0094 701/2
2015/0148129 A1 * 5/2015 Austerlade ............ G06Q 50/20 463/31
2015/0151160 A1 * 6/2015 Balakrishnan ........... A43B 3/34 700/91
2015/0154607 A1 * 6/2015 Frome .................. G06Q 30/018 382/209
2015/0208023 A1 * 7/2015 Boyle .................. G11B 27/034 386/278
2015/0265897 A1 9/2015 Gordon
2015/0294514 A1 * 10/2015 McCollum ............... G07C 9/28 340/5.81
2015/0296272 A1 * 10/2015 Sonabend .............. H04N 5/272 725/32
2015/0304735 A1 * 10/2015 Dutta ............. H04N 21/234327 725/62
2015/0326932 A1 * 11/2015 Hill .................... H04N 21/8126 725/32
2015/0328516 A1 * 11/2015 Coza .................... A63B 69/002 700/91
2015/0350606 A1 * 12/2015 Khanfor ............... H04N 23/667 348/157
2015/0373306 A1 * 12/2015 Flores ................ H04N 21/6175 348/157
2016/0042637 A1 * 2/2016 Cahill ................... H04W 4/029 701/3
2016/0054737 A1 * 2/2016 Soll ...................... H04N 23/695 701/3
2016/0054837 A1 * 2/2016 Stafford ................. G02B 27/01 463/33
2016/0065858 A1 * 3/2016 Kimber ................ H04N 23/631 348/333.05
2016/0083115 A1 * 3/2016 Hess ......................... B64F 3/02 701/3
2016/0101856 A1 * 4/2016 Kohstall .............. G05D 1/0669 244/17.23
2016/0173827 A1 6/2016 Dannan
2016/0191793 A1 * 6/2016 Yang .................... H04N 23/635 348/207.11

(56) References Cited

U.S. PATENT DOCUMENTS

| | | | | |
|---|---|---|---|---|
| 2016/0204978 | A1* | 7/2016 | Anderson | H04B 7/18506<br>370/225 |
| 2016/0240011 | A1* | 8/2016 | Fedosov | G01C 21/3611 |
| 2016/0292865 | A1* | 10/2016 | Floor | H04N 5/2628 |
| 2016/0297545 | A1* | 10/2016 | Yang | B64U 10/13 |
| 2016/0310820 | A1* | 10/2016 | Kline | A63B 71/0619 |
| 2016/0327959 | A1* | 11/2016 | Brown | G08G 5/34 |
| 2016/0349835 | A1* | 12/2016 | Shapira | B25J 9/1605 |
| 2016/0366392 | A1* | 12/2016 | Raghoebardajal | H04N 13/332 |
| 2016/0375340 | A1* | 12/2016 | Monari | A63B 71/06<br>345/474 |
| 2016/0378109 | A1* | 12/2016 | Raffa | G05D 1/0038<br>701/2 |
| 2017/0046865 | A1* | 2/2017 | Cantwell | H04N 13/204 |
| 2017/0053169 | A1* | 2/2017 | Cuban | G05D 1/104 |
| 2017/0055004 | A1* | 2/2017 | Krietzman | H04N 21/2187 |
| 2017/0061689 | A1* | 3/2017 | Petrany | H04N 7/18 |
| 2017/0086192 | A1* | 3/2017 | Bohlander | H04W 4/90 |
| 2017/0087453 | A1* | 3/2017 | Poisner | A63F 13/23 |
| 2017/0097645 | A1* | 4/2017 | Garland | G01S 11/16 |
| 2017/0108236 | A1* | 4/2017 | Guan | F24F 11/52 |
| 2017/0221394 | A1* | 8/2017 | Garcia Morchon | G09F 19/18 |
| 2017/0244985 | A1* | 8/2017 | Masterson | H04N 21/2187 |
| 2017/0323543 | A1* | 11/2017 | Glaser | H04N 1/3232 |

OTHER PUBLICATIONS

"Kinect," https://en.wikipeida.org/wiki/Kinect, Oct. 2, 2015.

Marty, et al., U.S. Appl. No. 17/682,726, entitled, "Systems and Methods for Monitoring Objects at Sporting Events," filed Feb. 28, 2022.

* cited by examiner

SYSTEMS AND METHODS FOR MONITORING OBJECTS AT SPORTING EVENTS

CROSS REFERENCE TO RELATED APPLICATION

This application is a continuation of and claims priority to U.S. patent application Ser. No. 17/682,726, entitled, "Systems and Methods for Monitoring Objects at Sporting Events" and filed on Feb. 28, 2022, which is incorporated herein by reference. U.S. patent application Ser. No. 17/682,726 is a continuation of and claims priority to U.S. Pat. No. 11,263,461, entitled, "Systems and Methods for Monitoring Objects at Sporting Events" and filed on Feb. 21, 2017, which is incorporated herein by reference. U.S. Pat. No. 11,263,461 claims priority to U.S. Provisional Application No. 62/297,528, entitled "Systems and Methods for Monitoring Objects at Sporting Events" and filed on Feb. 19, 2016, which is incorporated herein by reference. U.S. Pat. No. 11,263,461 is a continuation-in-part of and claims priority to U.S. Pat. No. 9,734,405, entitled "Systems and Methods for Monitoring Objects in Athletic Playing Spaces" and filed on Oct. 5, 2015, which is incorporated herein by reference.

RELATED ART

In general, it can be desirable to monitor an athlete or other objects at sporting events in order to provide an assessment of the athlete's performance or other information indicative of the sporting events. As an example, systems have been developed that help to train an athlete to perform better or more consistently by measuring a parameter indicative of the athlete's performance and providing feedback indicative of the measured parameter so that the athlete can be informed of how well he or she performed during the sporting event. Additionally, some systems are used to monitor a sporting event in order to provide statistics or other data about the sporting event for entertainment or training purposes. As an example, a system may monitor and report the length of a field goal in football, the speed of a baseball thrown by a pitcher, the speed of an athlete while sprinting, or information indicative of a trajectory of an object, such as a football, baseball, basketball, golf ball, hockey puck, soccer ball, or volleyball.

The systems and methods used to monitor athletes or other objects at sporting events can be complex and expensive, requiring various types of sensors. In addition, sensors are often mounted or installed at predefined locations limiting the amount and/or type of data that can be captured by the sensors. Efficient and inexpensive techniques for monitoring objects at sporting events and other types of events are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2 is a block diagram illustrating an exemplary drone, such as is depicted by

FIG. 1.

DETAILED DESCRIPTION

The present disclosure generally pertains to systems and methods for monitoring objects at sporting events or other types of events. A system in accordance with one embodiment of the present disclosure uses a wearable drone that has at least one camera or other sensor for capturing or otherwise sensing data. When the drone is to be used for monitoring, such as monitoring an object at a sporting event, the wearable drone may be detached from its user, and it may hover or otherwise fly within a certain position of an object to be monitored. While flying, the drone's sensor may be used to capture information, such as performance data or images, of the object during the sporting event.

Figure 1:
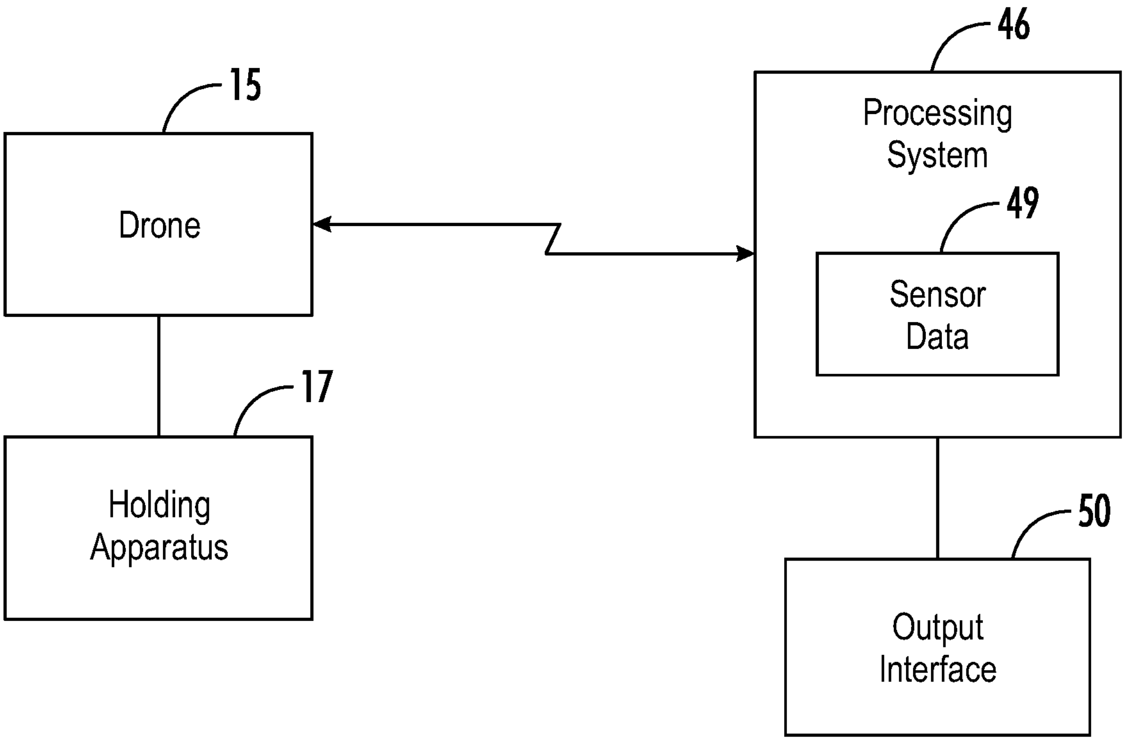
FIG. 1 is a block diagram illustrating an exemplary system for monitoring athletes or other objects at sporting events.

FIG. 1 depicts an exemplary system 10 for monitoring objects at sporting events or other types of events. As shown by FIG. 1, the system 10 comprises a movable drone 15 that is capable of flying to a desired location in order to monitor objects. In one embodiment, the drone 15 is worn by a user, such as an athlete who intends to participate in a sporting event, such as an athletic game or training session.

In the embodiment shown by FIG. 1, the drone 15 is detachably coupled to a user. As an example, the drone 15 may be mounted on or otherwise coupled to a holding apparatus 17 that holds the drone 15 and is attachable to a user. In this regard, the holding apparatus 17 may comprise a wristband that is wearable around the wrist of a user, and the drone 17 may be detachably coupled to the wristband so that the drone 17 may be detached from the wristband when it is to be used for monitoring. In an alternative embodiment, the drone 15 may form a wristband that is detachably coupled to (e.g., wrapped around) the wrist of a user, and the drone 15 may be detached from the user by unlocking the wristband. In other embodiments, other types of bands (e.g., armband, ankle band, headband, etc.) for temporarily securing the drone 15 to other body parts are possible. In addition, the holding apparatus 17 may comprise a clip or other type of coupling device for coupling the apparatus 17 to a clothing item or body part of the user. Various other devices and techniques for temporarily securing the drone 15 to a user are possible in other embodiments.

Figure 2:
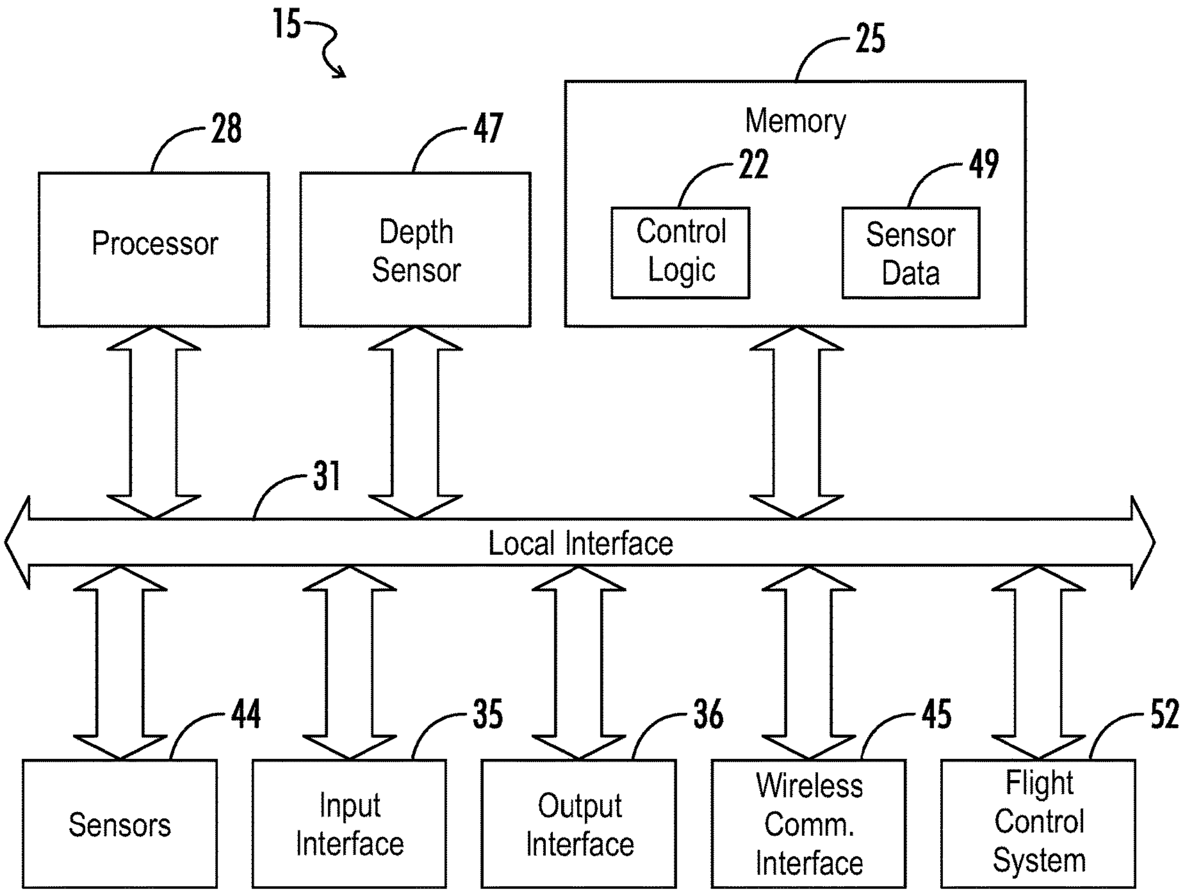

FIG. 2 depicts an exemplary embodiment of the drone 15. As shown by FIG. 2, the drone 15 includes control logic 22 for generally controlling the operation of the drone 15 as will be described in more detail hereafter. The control logic 22 can be implemented in software, hardware (e.g., logic gates), firmware or any combination thereof. In the exemplary drone 15 illustrated by FIG. 2, the control logic 22 is implemented in software and stored in memory 25.

Note that the control logic 22, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary drone 15 depicted by FIG. 2 comprises at least one conventional processor 28, such as a digital signal processor (DSP) or a central processing unit (CPU), that communicates to and drives the other elements within the drone 15 via a local interface 31, which can include at least one bus. As an example, to implement any of the data processing functionality described herein for the drone 15, the processor 28 may be programmed with instructions of the control logic 22, when such control logic 22 is implemented in software, for execution of the instructions according to techniques known in the art.

As shown by FIG. 2, the drone 15 has an input interface 35 that may be used to receive inputs. As an example, the input interface 35 may comprise a keypad, a keyboard, a mouse, buttons, switches, or other types of devices for receiving manual inputs or a microphone for receiving audio inputs. The drone 15 also has an output interface 36 that may be used to provide outputs. As an example, the output interface 36 may comprise a display (e.g., a liquid crystal display) for displaying text, images, or other information or a speaker for providing audio outputs. In some cases, a device (such as a touch-sensitive display) may be used to implement the input interface 35 and the output interface 36 by both receiving inputs and providing outputs.

The drone 15 further comprises one or more sensors 44 for capturing information of interest during monitoring activities. As an example, a sensor 44 may be implemented as an optical sensor (e.g., camera) for capturing images of a scene. In one embodiment, a sensor 44 includes a two dimensional camera for capturing two-dimensional images, and the drone 15 also has a depth sensor 47 for sensing depth (e.g., a distance from the depth sensor 47 to one or more objects). As an example, the depth sensor 47 may capture a depth image for use in monitoring objects, such as is described in more detail below and by U.S. patent application Ser. No. 14/874,555, entitled "Systems and Methods for Monitoring Objects in Athletic Playing Spaces" and filed on Oct. 5, 2015, which is incorporated herein by reference. Using data from such a depth sensor 47, a ground plane, such as an athletic playing surface, may be located in order to determine the direction of gravity. Such a depth sensor 47 may operate using infrared radiation, as is done by the Kinect® camera sold by Microsoft Corporation, although other wavelengths are possible. Many conventional depth sensors, such as the Kinect® camera, generally operate by projecting a pattern (e.g., dots or lines) of infrared radiation (IR) across a scene and measuring the time it takes for the IR to be reflected back to the sensor. Changes in contour of the reflecting surface affect the time required for energy to be reflected and/or the amount of light reflected (effectively "distorting" the pattern), thereby enabling the camera to estimate the contour based on the returns. Use of such depth sensors in conditions susceptible to high amounts of ambient light, such as outdoors, can be problematic as the ambient light, which is noise for the sensor measurements, can essentially "wash out" the IR returns making them undetectable. However, techniques have been developed to configure a depth sensor to selectively accept returns from the regions being scanned by the projector in order to limit the amount of noise introduced by ambient light, thereby enabling the depth sensor to be used in conditions involving high amounts of ambient light.

In some embodiments, a sensor 44 may be implemented as a proximity sensor for sensing whether an object is within a certain proximity or distance of the drone 15. Various other types of sensors may be used in other embodiments. Sensor data 49 indicative of the information sensed by the sensors 44 is stored in memory 25. Such sensor data 49 may be the raw data captured by the sensors 44 or may be processed data generated by processing of such raw data by the control logic 22. In addition, when a sensor 44 is implemented as a camera, the sensor data 49 may define the images captured by the sensor 44. Note that it is unnecessary for the sensor 44 and the depth sensor 47 to be on the drone 15. As will be described in more detail hereafter, the sensor 44 or the depth sensor 47 may be worn by the user, such as on clothing or a head-mounted display, or reside at other locations and wirelessly communicate with the processing system 46.

The drone 15 also has a wireless communication interface 45 for permitting it to communicate wirelessly with other devices. As an example, the wireless communication interface 45 may comprise a radio frequency (RF) radio capable of transmitting and receiving wireless RF signals. As shown by FIG. 1, the drone 15 wirelessly communicates with a processing system 46 using the wireless communication interface 45 in order to provide the sensor data 49 to the processing system 46. If desired, the processing system 46 may be configured to transmit commands for controlling the operation of the drone 15. The processing system 46 may also be configured to process and analyze the sensor data 49 as may be desired. Note that the processing system 46 may be implemented in hardware or any combination of hardware, software, and/or firmware. As an example, the processing system 46 may include one or more processors programmed with instructions to perform the data processing functions described herein for the processing system 46. In this regard, the processing system 46 may be implemented as one or more computers, such as a desktop, laptop, handheld (e.g., a smartphone), or mainframe computer. In some embodiments, the processing system 46 may be integrated with or otherwise reside on the drone 15 such that wireless communication of the sensor data 49 is unnecessary, or the processing system 46 may be tethered to the drone 15 permitting the sensor data 49 to be transmitted to the processing system 46 via a physical connection (e.g., one or more wires). In addition, it is possible for the drone 15 to store sensor data 49 during monitoring and for the sensor data 49 to be downloaded or otherwise provided to the processing system 46 after monitoring. The operation of the processing system 46 will be described in more detail below.

Figure 10:
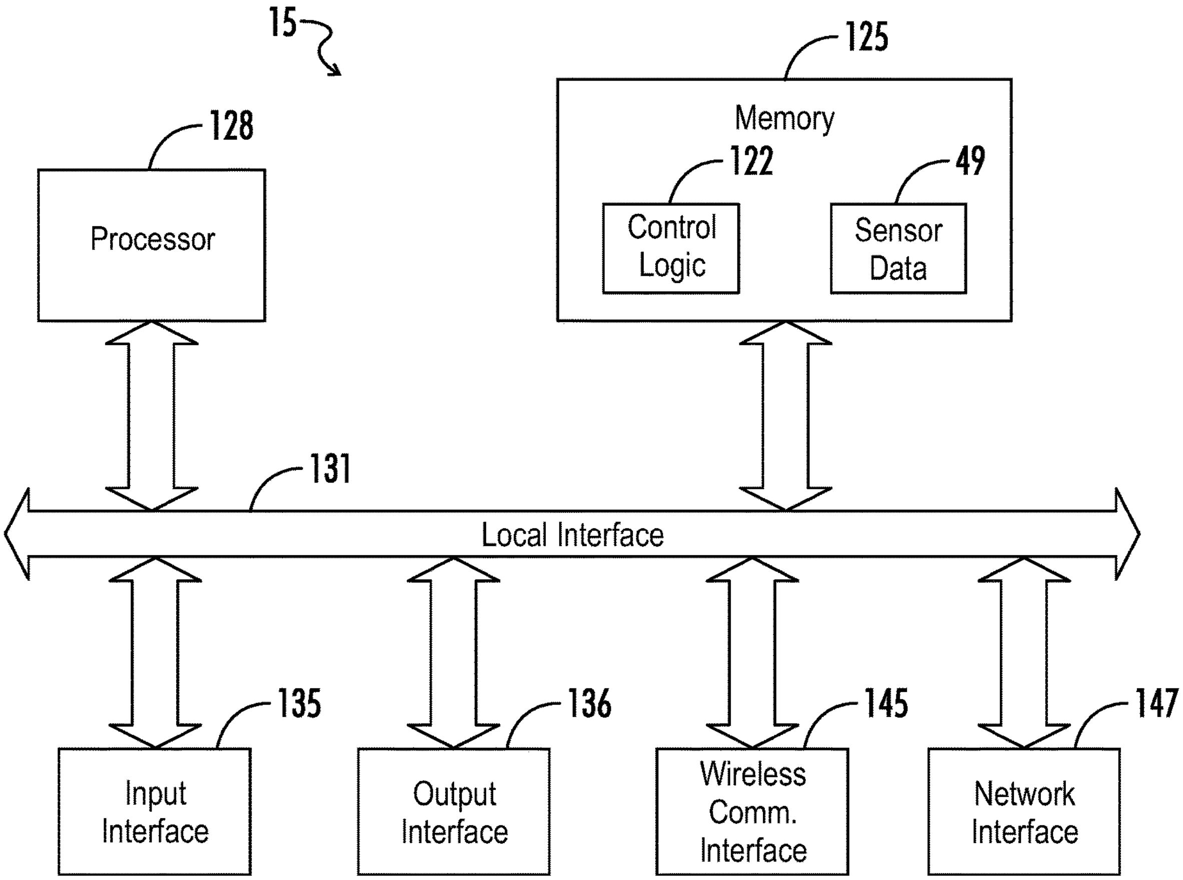
FIG. 10 is a block diagram illustrating an exemplary processing system, such as is depicted by FIG. 1.

In this regard, FIG. 10 depicts an exemplary embodiment of a processing system 46. As shown by FIG. 10, the processing system 46 includes control logic 122 for generally controlling the operation of the system 46 as will be described in more detail hereafter. The control logic 122 can be implemented in software, hardware (e.g., logic gates), firmware or any combination thereof. In the exemplary processing system 46 illustrated by FIG. 10, the control logic 122 is implemented in software and stored in memory 125. Note that the control logic 122, when implemented in software, can be stored and transported on any computer-readable medium for use by or in connection with an instruction execution apparatus that can fetch and execute instructions.

The exemplary processing system 46 depicted by FIG. 10 comprises at least one conventional processor 128, such as a digital signal processor (DSP) or a central processing unit (CPU), that communicates to and drives the other elements within the system 46 via a local interface 131, which can include at least one bus. As an example, to implement the functionality described herein for the processing system 46, the processor 128 may be programmed with instructions of the control logic 122, when such control logic 122 is implemented in software, for execution of the instructions according to techniques known in the art.

As shown by FIG. 10, the processing system 46 has an input interface 135 that may be used to receive inputs. As an example, the input interface 135 may comprise a keypad, a keyboard, a mouse, buttons, switches, or other types of devices for receiving manual inputs or a microphone for receiving audio inputs. The processing system 46 also has an output interface 136 that may be used to provide outputs. As an example, the output interface 136 may comprise a display (e.g., a liquid crystal display) for displaying text, images, or other information or a speaker for providing audio outputs. In some cases, a device (such as a touch-sensitive display) may be used to implement the input interface 135 and the output interface 136 by both receiving inputs and providing outputs. The output interface 136 may be integrated with components of the processing system 46. As an example, the output interface 136 may be a display screen of a smartphone that has one or more processors for performing the data processing functions described herein for the processing system 46.

The processing system 46 also has a wireless communication interface 145 for permitting it to communicate wirelessly with other devices. As an example, the wireless communication interface 145 may comprise a radio frequency (RF) radio capable of transmitting and receiving wireless RF signals. As shown by FIG. 1, the processing system 46 wirelessly communicates with the drone 15 using the wireless communication interface 145 in order to receive the sensor data 49. If desired, the processing system 46 may be configured to use the wireless communication interface 145 to transmit commands for controlling the operation of the drone 15. The processing system 46 may also have a network interface 147, such as a modem, for enabling the processing system 46 to communicate with a network (e.g., local area network (LAN), a wide area network (WAN), or other type of network). As an example, the processing system 46 may communicate with other devices via the Internet or other type of network in order to provide access to the sensor data 49 or other information processed by the processing system 46. In addition, as noted above, it is possible for components of the processing system 46 to reside at various locations, including the drone 15. As an example, it is possible for the same processor to be used to execute instructions of the control logic 22 shown by FIG. 2 and the control logic 122 shown by FIG. 10.

Note that the sensors 44 may include a location sensor, such as a global positioning system (GPS) sensor, for sensing the location (e.g., geographical coordinates) of the drone 15. Such location sensor may be used to help navigate or position the drone 15 as may be desired. As an example, the location of the drone 15 may be compared to a location of another object (such as a player) to move the drone 15 to a desired location relative to the other object. As an example, a player of interest may wear a location sensor that transmits location coordinates to the processing system 46, and the processing may 46 be configured to compare such location coordinates to location coordinates received from the drone 15 in order determine a desired location for the drone 15 (e.g., a predefined position from the player). The processing system 46 then transmits commands to the drone 15 for moving it to the desired location so that the drone 15 is a desired position from the player of interest. The location sensor may be used in other ways for other embodiments.

The processing system 46 may be communicatively coupled to an output interface 50, such as a display device or a printer, for providing outputs to users. In some embodiments, the output interface 50 is separated from components of the processing system 46. In such examples, the output interface 50 may communicate with the processing system 46 wirelessly or via one or more physical connections. As an example, the processing system 46 may be implemented as a laptop or other type of computer that communicates wirelessly with a smartphone or other type of computer having the output interface 50. Note that networks may be used for communication between components of the system 10. As an example, a network, such as a local area network (LAN) or wide area network (WAN), may be used for communication between the drone 15 and the processing system 46 or between the processing system 46 and the output interface 50. In one embodiment, the processing system 46 is configured to communicate with one or more output interfaces 50 using the Internet and/or a cellular network, but other types of configurations are possible in other embodiments.

As shown by FIG. 2, the drone 15 has a flight control system 52 for enabling the drone 15 to fly through air. As an example, the flight control system 52 may have a controller and one or more propellers or other propulsion devices for propelling the drone 15 under the control of the flight controller, as may be desired. Such flight controller may be implemented in hardware or any combination of hardware, software, and/or firmware. For example, the flight controller may include one or more processors programmed with software in order to implement the data processing functions of the flight controller described herein.

Figure 3:
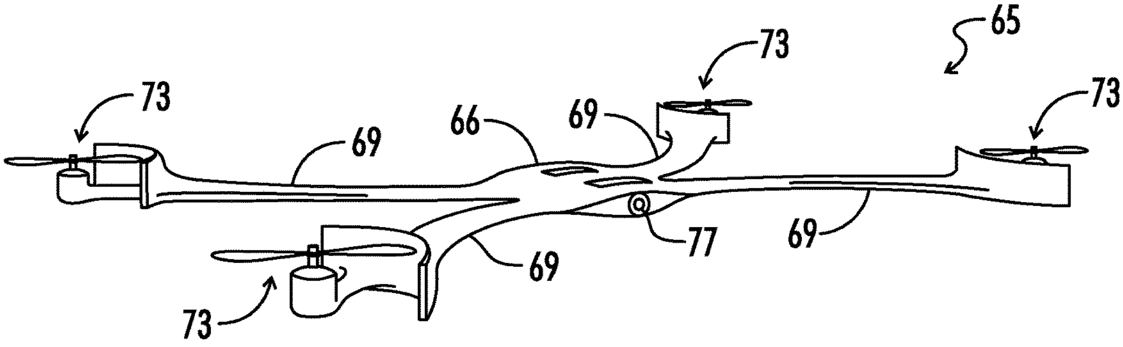
FIG. 3 (PRIOR ART)
FIG. 3 is a three-dimensional perspective of a wearable drone that may be programmed for use in the monitoring system depicted by FIG. 1.
Figure 4:
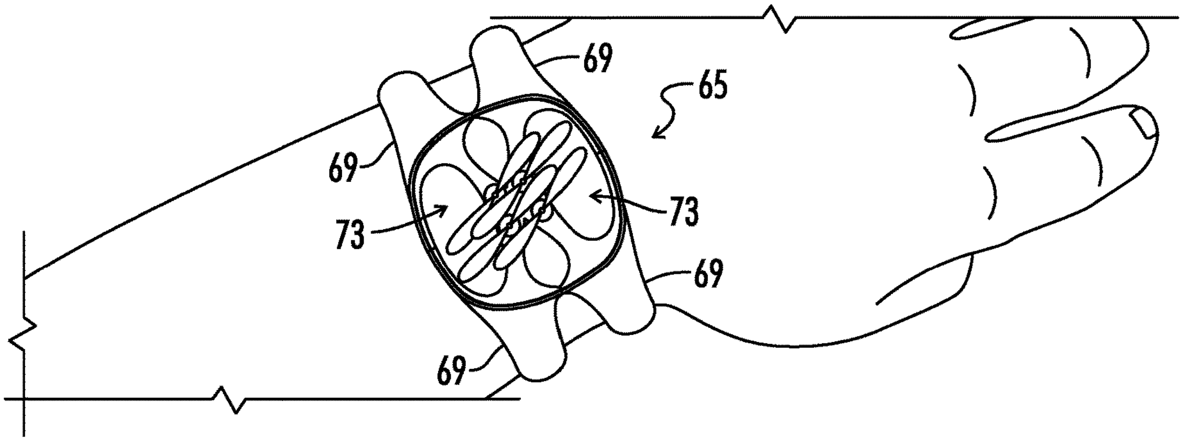
FIG. 4 (PRIOR ART)
FIG. 4 is a three-dimensional perspective of the drone depicted by FIG. 3 being worn around a wrist of a user.
Figure 5:
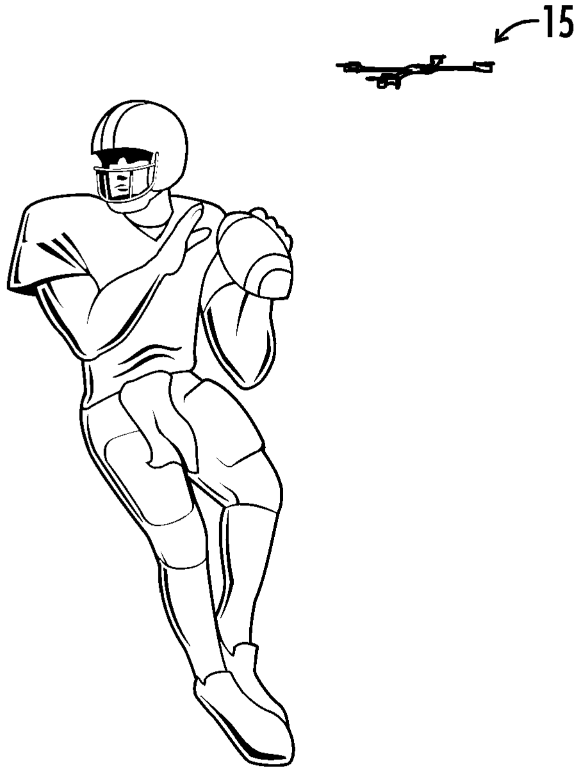
FIG. 5 is a perspective view of a football player with a drone positioned behind the football player.
Figure 6:
FIG. 6 is a three-dimensional perspective of a basketball player with a drone positioned behind the basketball player.

The flight control system 52 may comprise any number and types of airfoils (e.g., wings or rotors) for providing lift. As an example, FIG. 3 shows a conventional drone 65 that can be programmed or otherwise controlled or modified to implement a drone 15 for monitoring athletes, as described herein. The drone 65 of FIG. 3 has a body 66 from which four flexible arms 69 extend. At the end of each arm 69 is a propeller 73 that spins under the direction and control of a flight controller (not shown) housed within the body 66 in order to generate lift and to propel the drone 65 through air. The drone 65 also has a camera 77 (e.g., a video camera or other type of camera) for capturing images as the drone 65 flies. Note that the arms 69 are capable of bending and detachably coupling to one another so that the drone 65 can be worn around a user's wrist, similar to a watch, as shown by FIG. 4. When monitoring is desired, the arms 69 can be detached from one another so that the drone 65 can be removed from the user's wrist, and the arms 69 may then be positioned as shown by FIG. 3 to permit the drone 65 to fly under the control of its flight controller. Even though the arms 69 are sufficiently flexible to permit them to bend around a user's wrist, the arms 69 also have sufficient rigidity to permit them to maintain their shape as the drone 65 is flying under the aerodynamic forces generated by the propellers 73. In other embodiments, other types of drones may be used. As an example, a drone may have wheels, tracks, or other devices for enabling it to move along the ground or other surface.

There are various types of parameters that can be monitored by the drone 15 during operation. As an example, the user wearing the drone 15 may release it for flight just before engaging in a sporting activity such as training for a sporting event or competing in a sporting event, such as a game of basketball, football, baseball, golf, hockey, soccer, volleyball, skateboarding, and X games. After being released for flight, the drone 15 may be designed to hover or otherwise fly within a certain region, such as a certain distance from the user or other object and/or at a certain height, and to capture sensor data 49 indicative of the user's performance in the sporting activity. As an example, when the user is taking a basketball shot by launching a basketball toward a basketball goal, at least one sensor 44 is configured to provide sensor data 49 indicative of the shot, and the processing system 46 is configured to analyze the sensor data 49 to determine one or more metrics indicative of a quality of the basketball shot, such as release height, release velocity, shot height, entry angle, entry velocity, shot trajectory, make/miss (i.e., whether the basketball passes through the hoop during the shot), or the ball speed or velocity at any point along the shot trajectory. Based on the sensor data 49, such as images of the user taking a basketball shot, the processing system 49 may determine shot type, such as whether the shot is a jump shot, a lay-up, or a three-point shot. Note that the processing system 46 may use the shooter's location relative to the basketball goal at the time of the shot to determine shot type. For example, a shot with a certain proximity close to the goal on a side of the rim while the shooter is moving horizontally may be determined to be a lay-up whereas another shot greater than a certain distance from the goal may be determined to be a three-point shot. Exemplary metrics that can be determined, analyzed, or otherwise processed by the processing system 46 are described in U.S. Pat. No. 7,850,552, entitled "Trajectory Detection and Feedback System" and issued on Dec. 14, 2010, which is incorporated herein by reference, and U.S. patent application Ser. No. 12/127,744, entitled "Stereoscopic Image Capture with Performance Outcome Prediction in Sporting Environments" and filed on May 27, 2008, which is incorporated herein by reference.

In some embodiments, the sensors 44 comprise a camera that is capable of capturing panoramic images (e.g., 360° views). Such a camera may be configured to capture multiple images as the camera is moved and then to stitch or otherwise combine the images together to form a panoramic image. In another embodiment, the camera has multiple lenses that receive light from multiple directions thereby enabling the camera to simultaneously capture images from different directions. The panoramic camera is configured to stitch such images together to form a panoramic image. As an example, the camera might have three lenses that are oriented at 120° relative to each other in order to capture a 360° view around the camera.

In some embodiments, the control logic 22 is configured to provide inputs to the flight control system 52 in order to automatically position the drone 15 at a predefined position relative to a particular user or other object. As an example, the control logic 22 may position the drone 15 a certain distance and/or height from an athlete participating in a sporting event. As the athlete moves, the control logic 22 may sense his movements via use of the one or more sensors 44 and then provide inputs to the flight control system 52 such that the drone 15 is moved to track the movement of the athlete. As an example, the control logic 22 may attempt to keep the drone at a constant position (e.g., distance and/or height) from the athlete as he moves. While the athlete is moving or otherwise participating in an event, information indicative of the his performance and movements is captured by the sensors 44 and stored in memory 25 as sensor data 49.

The control logic 22 may be configured to distinguish the athlete of interest from other athletes at the event in order to assist the control logic 22 in tracking the athlete's movements. As an example, at least one of the sensors 44 may be configured to capture images of the athlete's face, and the control logic 22 may be configured to employ known facial recognition algorithms to distinguish the athlete of interest from other athletes. If the athlete of interest is wearing a jersey with a number printed on the jersey, the control logic 22 may analyze images of the user's jersey to distinguish him from other athletes. As an example, the control logic 22 may analyze a captured image of the athlete to determine the jersey color and jersey number for identifying the athlete. In this regard, in many sporting events, each possible jersey color and number combination is unique such that any player can be identified by analyzing his jersey. In other embodiments, other techniques for identifying the athlete or other user of interest are possible.

In one example, the drone 15 is used to monitor a quarterback during a football game or practice. The drone 15 may be positioned at a certain position relative to the quarterback to permit suitable monitoring with very little risk of the drone 15 being struck by the athletes or objects in the game practice. As an example, the drone 15 may be positioned approximately 20 feet in the air and approximately 20 feet behind the quarterback (i.e., on a side of the quarterback opposite of the line of scrimmage). Thus, the drone 15 should remain at a sufficiently high altitude such that it is not reachable by athletes during gameplay. In addition, when the quarterback throws a pass, he usually throws the pass forward (toward and past) the line of scrimmage such that the position of the drone 15 behind the quarterback reduces the likelihood of the drone 20 being struck by the ball during a pass even though the drone 15 may be at a height through which the ball may pass.

During gameplay, the drone 15 may be configured to capture images of the quarterback and/or other objects. As an example, the drone 15 may capture a video feed and wirelessly transmit the video feed so that it can be displayed for entertainment or other purposes. As an example, the video feed may be included in a television or other type of video broadcast of the game. The video feed may also be used for other purposes. As an example, the video feed may be stored and later displayed to the quarterback or coach for assisting with the quarterback's training.

In one embodiment, processing system 46 is configured to analyze the images captured by the drone 15 and to identify the quarterback within the images. The processing system 46 also identifies the football within the images based on the football's color and shape. Based on the images, the processing system 46 is configured to determine when the football is thrown by the quarterback. There are various techniques that can be used to determine when the football is thrown.

In this regard, the quarterback is generally expected to have a certain profile, referred to hereafter as "throwing profile," as he is throwing the football where his forearm and hand are above his shoulder while his hand is gripping the football. While his forearm and hand are in such profile, the football is released by the quarterback such that the football separates from the quarterback's hand. The processing system 46 may be configured to detect a throw when (1) the quarterback's forearm and hand are in the expected throwing profile and (2) the football separates from the quarterback's hand. Note that separation of the football from the quarterback when his forearm and hand are not in the throwing profile may indicate the occurrence of another event, such as a handoff, a pitch, or a fumble.

When a pass is detected, the processing system 46 is configured to track the trajectory of the pass and to calculate various trajectory parameters indicative of pass quality. As an example, the processing system 46 may calculate release height, release angle, velocity, rotation rate, maximum pass height, pass distance, or other parameters that may be of interest. Note that various parameters, such as release height, pass height, and pass distance, may be determined through the use of a depth sensor 47, which is capable of measuring the depth of the ball (relative to the sensor) and comparing such depth to the depths measured for a ground plane (e.g., athletic playing surface) or other objects within the depth image. Further, speed or velocity may be calculated by estimating a distance that the football travels between trajectory points and measuring the time required for the football to travel between the trajectory points. Dividing distance by time yields the ball's speed.

In one embodiment, the location (e.g., coordinates in free space) of the football at various trajectory points are determined, and such points are used to estimate a trajectory curve representing the ball's trajectory during the pass. In this regard, once the ball is released, gravity is usually the predominant force that acts on the ball during flight, and if the direction of gravity is known, various parameters, such as velocity at any point along the trajectory can be calculated using the estimated trajectory curve. In one embodiment, the processing system 46 determines the direction of gravity using techniques similar those described in more detail below and by U.S. patent application Ser. No. 14/874,555, and converts the coordinates provided by the depth sensor 47 into a gravity-based coordinate system so that the direction of gravity relative to the ball's trajectory is known. Various trajectory parameters and techniques for determining trajectory parameters are described by U.S. Pat. No. 7,850,552 and U.S. patent application Ser. No. 12/127,744.

It should be noted that various parameters may indicate the outcome of the pass and may be dependent on the actions or positions of another athlete, such as a receiver who is attempting to catch the pass. In this regard, the images captured by the drone 15 may include the receiver, as well as one or more defenders attempting to defend the pass. The processing system 46 may identify the receiver who is attempting to catch the pass, referred to hereafter as "target receiver," using various techniques. For example, by tracking the football, the processing system 46 may determine the trajectory location (referred to hereafter as "trajectory endpoint") where the path or velocity of the football along its trajectory is materially disrupted, indicating the football has struck an object, such as the ground or an athlete of the football game or practice. The athlete wearing a certain color jersey closest to the trajectory endpoint may be identified as the target receiver.

By analyzing the images captured after the football reaches the endpoint, the processing system 46 can determine whether the football was caught (i.e., pass completed) by the target receiver. As an example, if the football appears to remain in the hands of the target receiver for at least a threshold amount of time based on the video images captured by the drone or other cameras, the processing system 46 may determine that the football was caught. If, on the other hand, the video images show that the football remains in the hands of a defender wearing a different color jersey for at least the threshold amount of time, then the processing system 46 may determine that the pass was intercepted. If the football is determined to strike the ground before a pass completion or interception is made, then the processing system 46 may determine that the pass was incomplete. In other embodiments, other techniques may be used to determine the outcome status (e.g., completion, interception, or incompletion) of the pass. Note that sensors (e.g., cameras) in addition or in lieu of the ones on the drone 15 may be used to provide information to the processing system 46.

Over time, the processing system 46 may collect and store various statistics regarding the quarterback's performance, such as total attempts, total completions, total interceptions, completion percentage, interception percentage, average release height, average release angle, average velocity, average rotation rate, average maximum pass height, average pass distance, or other statistics that may be of interest. Further, in collecting statistics about multiple players, the processing system 46 is preferably configured to identify the athletes so that the appropriate data can be correlated with the identified athletes. As an example, athletes may be identified based on the number on their jerseys, as described above, or through other types of techniques, such as facial recognition or other known techniques for identifying individuals.

Note that the performance data collected by the processing system 46 may be categorized in any manner as may be desired. As an example, for a quarterback, statistics may be calculated based on pass distance. For example, total attempts, total completions, total interceptions, completion percentage, interception percentage, etc. may be calculated for passes thrown in a certain distance range, such as 0 to 10 yards while the same or similar statistics for another distance range, such as 10 to 20 yards may be separately tracked. In addition, the processing system 46 may implement algorithms for calculating various qualitative information about the passes.

As an example, based on the target receiver's location and velocity at a certain point, such as the quarterback's release of the football or at a point while the football is in flight, the processing system 46 may identify a zone in the playing space, referred to hereafter as "target zone" where the football is ideally thrown in order to complete a pass to the target receiver. The target zone may also be based on various other factors, such as the location and velocity of one or more defenders at the time of the quarterback's release of the football or a point while the football is in flight. The processing system 46 may also compare the trajectory of the pass to the target zone to determine whether the pass is directed to the target zone (e.g., whether the trajectory intersects with the target zone) or a distance that the trajectory is from the target zone. Directing a pass to the target zone or a small distance from the target zone generally may indicate a better quality pass regardless of whether the pass is actually completed. The processing system 46 is configured to calculate various parameters based on the pass trajectory relative to the target zone. As an example, the processing system 46 may determine the trajectory's average distance from the target zone for a plurality of passes, noting that the target zone may be at a different location for different passes. Further, the size of the target zone may be based on a distance of the pass or other factors. For example, shorter passes may have smaller target zones and longer passes may have larger target zones. The target zone data may also be categorized based on pass distance or other parameters. As an example, the average distance from the target zone for passes within one distance range (e.g., 0 to 20 yards) may be determined, and the average distance from the target for passes within another distance range (e.g., 20 to 40 yards) may be separately determined.

Note that the drone 15 may be configured to monitor the data 49 from the sensors 44 and to provide inputs to the flight control system 52 based on such data 49. As an example, the control logic 22 may be configured to identify the player being monitored (e.g., the quarterback in the instant example) and to change the location of the drone 15 based on such player's movement. As an example, the control logic 22 may control the drone 15 such that it remains within a certain position or proximity of the quarterback as he moves. Thus, if the quarterback rolls left, the drone 15 may automatically move left so that it remains directly behind the quarterback. If the quarterback advances down the field, the drone 15 may also move down the field to stay a certain distance behind the quarterback. In other embodiments, it is unnecessary for the drone 15 to be within the field of play. As an example, the drone 15 may be positioned in the air on the sideline (off of the field of play) and move back and forth along the sideline based on movement of objects in the field of play. For example, as a player of interest advances down the field, the drone 15 may move in a corresponding manner along the sideline. The drone 15 also may be positioned at the end of the field such as behind the goalposts or end zone. The drone 15 may move along a boundary of other fields or courts of play for other sports, such as soccer, hockey, volleyball, basketball, tennis, etc.

The control logic 22 may also implement a collision avoidance algorithm in order to protect the drone 15 from damage and to prevent the drone 15 from interrupting play of the game. As an example, based on at least one sensor 44, such as an image captured by a camera or a measurement by a proximity sensor, the control logic 22 may determine that collision with an object (e.g., football, goalpost, person, or other drone 15) is imminent and then provide inputs to the flight control system 52 in an attempt to move the drone 15 in a manner that avoids the collision. The control logic 22 also may be configured to take certain action, such as change a state of the drone 15, in order to protect the drone 15 from the imminent collision. As an example, if a component (e.g., a camera or other sensor 44) of the drone 15 is extended, the control logic 22 may retract such component in order to reduce the likelihood that the component would be damaged by the collision. Various other actions may be taken to protect the drone 15 from damage.

Also note that any of the athletes or other individuals (e.g., referees, coaches, trainers, cheerleaders, mascots, etc.) at the football game or practice may be monitored by the drone 15 according to similar techniques described above for the quarterback, and athletes or individuals at other sports may be similarly monitored as well. As an example, the drone 15 may be configured to monitor the performance of a field goal kicker in a football game or practice. In such example, the drone 15 may be positioned behind the kicker, on the sideline, behind the goalposts, or at other locations as described above. Video images of the kicker may be captured while he is kicking the football. Based on the images, the processing system 46 may determine various parameters indicative of kick performance or quality. As an example, the processing system 46 may measure foot speed during the kick or determine the location on the football where the kicker's foot strikes the football. In addition, as described above for a pass, the drone 15 may capture images of the football while the football is in flight from a kick, and the processing system 46 may analyze the captured images to determine a trajectory of the football. Based on the trajectory, the processing system 46 may determine various parameters, such as the football's velocity, rotation rate, distance of travel, ascension angle (i.e., the angle, relative to horizontal or the playing surface, of the beginning of the trajectory while the football is rising after the kick) or other parameters that may be of interest. Based on the trajectory and/or comparison of images of the football relative to images of the goalposts, the processing system 46 may also determine whether the field goal was successful or where the football passes through or past the goalposts. As an example, the processing system 46 may determine a horizontal distance of the trajectory from a certain point, such as a center of the make zone (i.e., a point halfway between the goalposts). If the field goal is unsuccessful, the processing system 46 may determine a horizontal distance of the trajectory from the nearest goalpost (indicating how far the field goal was missed).

Note that the position of the drone 15 may be controlled based on a situational awareness of gameplay. As an example, the control logic 22 may control the drone 15 to operate in one mode, referred to herein as the "quarterback mode," in which the drone 15 is operated to monitor the play of the quarterback, as described above. When the offense attempts a field goal, the control logic 22 may transition the operation of the drone into another mode, referred to herein as the "kick mode," in which the drone 15 is operated to monitor the kicker's performance. As an example, in the quarterback mode, the drone 15 may be positioned behind the quarterback, as described above, and for the kick mode, the drone 15 may be positioned at another location, such as on the sidelines to better capture certain parameters, such as ascension angle. Also, when the ball changes sides, such as after a turnover, the operation of the drone 15 may be changed from a mode to monitor the quarterback on one team to a mode for monitoring the quarterback (or other player) of the other team.

There are various techniques that can be used to determine when to transition the operational mode of the drone 15. As an example, when an event occurs for which there is to be a mode transition, a user observing the game or practice may provide an input indicative of the mode change. Such input may be received by an input interface of the processing system 46 or other device, such as a smartphone, computer (e.g., laptop), or other device capable of receiving inputs, and such input may be wirelessly transmitted to the drone 15. In response, the control logic 22 may change the operational mode of the drone 15, as indicated by the input. In another embodiment, the drone 15 may be configured to receive the input directly from a user. As an example, one of the athletes, such as the player being monitored, or other user may signal an input through a particular body motion (such as waving his hand in a predefined manner) or by providing a voice command to the drone. For a body motion, the processing system 46 may be configured to analyze the images captured by the drone 15 to determine when the athlete or other user has signaled the input.

In other embodiments, the decision about when to change modes may be based on data from the sensors 44. As an example, the processing system 46 may analyze images captured by a camera of the drone 15 or other device to determine which team is on offense and wirelessly transmit control information to the drone 15 for causing the control logic 22 to position the drone 15 according to the quarterback mode to monitor the quarterback of the offense. There are various techniques that can be used to determine which team is on offense. As an example, the drone 15 or other device may capture an image of the scoreboard, which may be operated to indicate which team is on offense (such as by displaying an image of a football next to the name or score of the team on offense). Based on the location of such image or other indication by the scoreboard, the processing system 46 may determine which team is on offense.

It is possible for the processing system 46 to make certain situational decisions (such as which team is on offense) based on the activity occurring in the field of play. As an example, before a play, it is often the case that the teams huddle on their respective sides of the football. The defense often huddles closer to the football than the offense. Thus, based on the location of a team's huddle relative to the football in the images captured by the drone 15, the processing system 46 may determine whether that team is on offense. In another example, certain referees are often positioned on a particular side of the ball depending on which team is on offense. As an example, the head referee is often positioned on the offense side of the ball. The processing system 46 may be configured to identify a referee (using user identification techniques described above, such as facial recognition or clothing recognition) to determine which team is on offense based on the referee's position relative to the football. In addition, as described above, the processing system 46 may be configured to recognize certain players, and it is often the case that a particular player, such as the quarterback, only plays on offense or defense. The processing system 46 may be configured to determine which team is on offense based on which player or players are on the field. As an example, if the processing system 46 determines that the quarterback of a particular team is on the field of play, the processing system 46 may be configured to determine that such team is on offense. In such case, the processing system 46 may transmit a command to the drone 15 for causing the drone 15 to operate in a certain mode, such as the quarterback mode for monitoring the quarterback. When the quarterback of one team leaves the field of play, the processing system 46 may determine that the other team is on offense when the system 46 detects the presence of the other team's quarterback on the field of play. If the quarterback of a team leaves the field of play and if the field kicker of that same team enters the field of play, the processing system 46 may determine that a field goal attempt is occurring. In such case, the processing system 46 may transmit to the drone 15 a command for causing the drone 15 to operate in the kick mode. In basketball, the processing system 46 may identify the player who is dribbling to determine which team is on offense. In other examples, the presence of other types of players on the field or court of play may be sensed in order to detect other types of game situations and to operate the drone 15 in other types of modes.

In a basketball game or practice, the drone 15 may be positioned at any point above the court or along the boundaries of the court, as described above for a football field. In one example, the drone 15 is positioned in the air at a certain distance (e.g., about 20 feet) above a hoop of a basketball goal. Using the sensors 44, such as a video camera, and/or a depth sensor 47, the drone 15 may capture images of the basketball and the players on the court. When a player attempts a shot on the goal, the drone 15 may capture images of the shooter and the basketball as it travels toward the hoop. The processing system 46 may be configured to determine the ball's trajectory and various parameters indicative of the shooter's performance in the basketball shot. Exemplary techniques for determining such parameters are described in U.S. Pat. No. 7,850,552 and U.S. patent application Ser. No. 12/127,744.

The drone 15 may be configured to monitor the images captured by a sensor 44 and to control movement of the drone based on such images. As an example, the control logic 22 may be positioned a certain proximity (e.g., a certain distance and direction) from the shooter, such as about 10 feet behind the shooter and about 10 feet in the air). As described above for the quarterback mode, the drone 15 may move in conjunction with the shooter's movements in order to maintain its relative position with the shooter.

Note that it is unnecessary for the control logic 22 within the drone 15 to monitor the captured images in order to position the drone 15 as described herein. As an example, for any of the embodiments described herein, the processing system 46 may be configured to monitor the captured images and to control the movement of the drone 15 remotely based on such images.

When the drone 15 is positioned behind the shooter or other player of interest, as described above, the images captured by the drone 15 have a perspective from the shooter's viewpoint. That is, the images closely resemble what the shooter or other player being monitored sees during gameplay. Such a feature may be beneficial for training or entertainment purposes. In this regard, the images may be recorded and later rendered to the shooter or other player of interest so that he can examine gameplay and his actions from essentially the same viewpoint that he was seeing during gameplay. The images may also be broadcast or otherwise rendered to fans who can see gameplay from the viewpoint of the shooter or other player of interest. This type of viewpoint may be provided for other sports, as well. For example, positioning the drone 15 behind the quarterback in the quarterback mode described above allows users to see gameplay from the quarterback's approximate viewpoint. In some embodiments, the quarterback may wear a location sensor to provide to the processing system 46 data indicative of the quarterback's location, and the processing system 46 may be configured to convert the coordinates of the image data into coordinates that are relative to a coordinate system associated with the quarterback so that the viewpoint of the images matches that of the quarterback, as described in more detail below with respect to a putter in golf.

The drone 15 may be used to monitor golfers. In this regard, a particular golfer may be identified in the images captured by the drone 15 or by other type of sensor data 49 using any of the recognition techniques described herein, and the drone 15 may be positioned a certain proximity from the identified golfer, as described above in other sports and as shown by FIG. 7A. As an example, the drone 15 may be positioned at a certain location relative to the golfer to permit the sensors 44 to capture the golfer's swinging motion as well as ball flight. As described above for other sports, the processing system 46 may be configured to determine the ball's trajectory based on the images or other type of sensor data captured by the drone 15. Based on the golfer's body or club motion during his swing and/or the trajectory of the golf ball, the processing system 46 may be configured to determine various parameters indicative of the golfer's performance.

When the golfer is putting, the processing system 46 may be configured to analyze the images captured by the drone 15 in order to determine the topography, including slope, of the putting surface (e.g., the green). Using techniques similar to those described below and in U.S. patent application Ser. No. 14/874,555, the processing system 46 may be configured to determine the direction of gravity within the images in order to determine the slope of the green's surface relative to gravity. As an example, the processing system 46 may be configured to convert the coordinates provided by a depth sensor 47 or other type of optical sensor from the sensor's coordinate system to a gravity-based coordinate system. As described further in U.S. patent application Ser. No. 14/874,555, the direction of gravity may be defined by first identifying a large flat plane within the drone's viewing area from a depth sensor 47. The processing system 46 may assume that the direction of gravity is at a predefined angle (e.g., 90 degrees) relative to the identified plane. In other embodiments, the drone 15 may have a plurality of accelerometers, and the direction of gravity may be determined using readings from the accelerometers according to known techniques. The processing system 46 may also identify an object and determine that the direction of gravity is at predefined angle relative to the object. As an example, in golf, the processing system 46 may be configured to analyze the images captured by a sensor 44 to identify the green hole at which the ball is to be putted. The processing system 36 may identify the ring formed by the lip of the hole and determine that the direction of gravity is perpendicular to the plane defined by such ring. Yet other techniques for determining the direction of gravity are possible in other embodiments.

In other embodiments, different techniques may be used to determine the topology of the putting surface. As an example, data indicative of the topology of the green (including hole placement) may be predefined and stored in a database or other form of memory accessible to the processing system 46.

In addition to determining the green's topology and the direction of gravity, the processing system 46 may also be configured to identify the green's hole, as described above, and the golfer's ball within the images. Based on the topography of the putting surface, the location of the hole relative to the golfer's ball, and the direction of gravity, the processing system 46 may be configured to calculate or otherwise determine an optimal path for the ball in order for the golfer to make the putt (i.e., for the ball to be putted into the hole). The processing system 46 may then provide feedback information to the golfer indicative of such path. As an example, the processing system 46 may use the output interface 50 or 136 to display an image of the green, including the location of the hole and the golfer's ball. Within such image, the processing system 46 may display a virtual curve extending from the ball to the hole along the path corresponding to the optimal path determined by the processing system 46. Thus, by viewing the image and specifically the virtual curve, the golfer is able to see the optimal path of the ball for the putt.

Figure 7A:
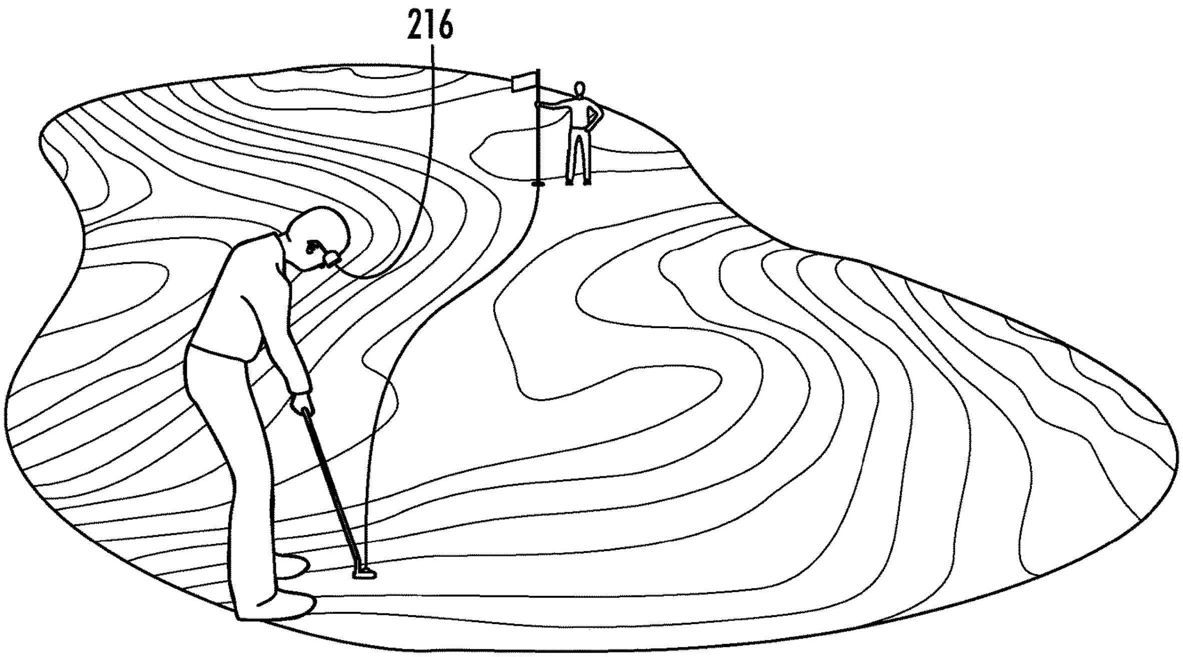
FIG. 7A is a three-dimensional perspective of a golfer attempting a putt on a green of a golf course.
Figure 7B:
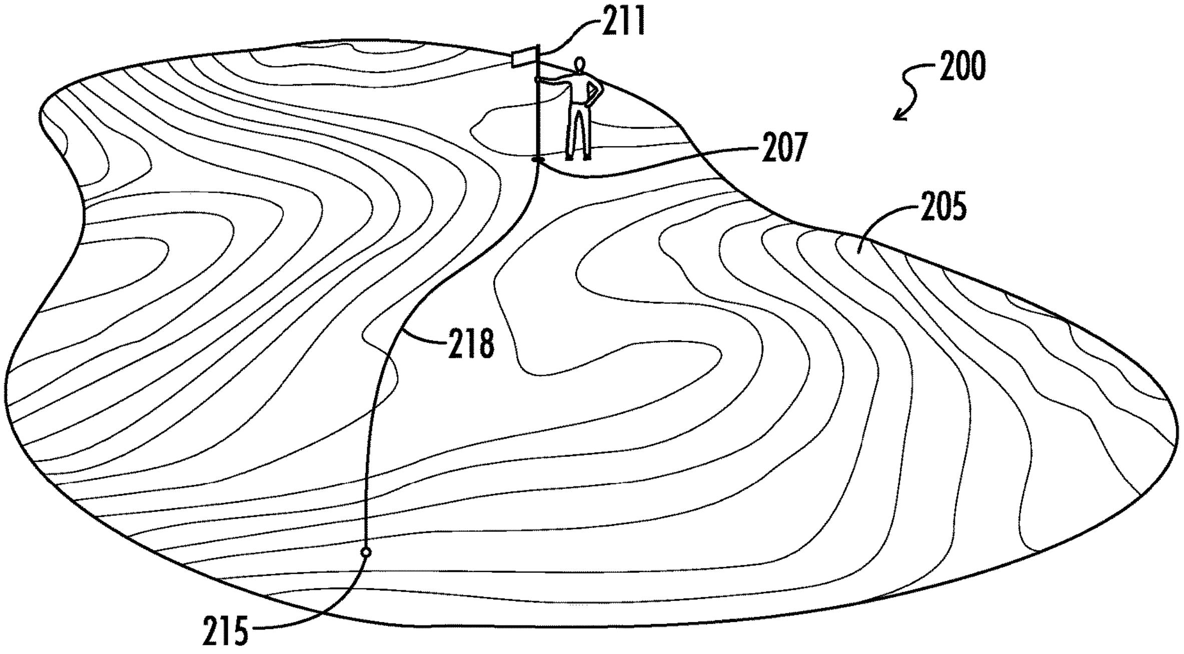
FIG. 7B depicts an image of the green of FIG. 7A displayed to a user for depicting an optimal trajectory for a putt of a golf ball on the green.

Note that there are various ways that feedback can be provided to the golfer. As an example, the image of the green described above may be displayed on the golfer's smartphone or other hand-held or mobile device carried by the golfer. As an example, FIG. 7B shows an exemplary image 200 that may be displayed to the user on an output interface 50 of a mobile device, such as a smartphone. The image 200 shows a green 205 having a hole 207 with a flag 211 positioned in the hole 207 to mark the placement of the hole 207. The image 200 also shows a golf ball 215 resting on the green 205 and a virtual curve 218 representing the optimal path determined by the processing system 46 for the user's putt. Note that the image 200 may be captured by the sensor 44 of a drone 15 or otherwise, such as by a camera that may be mounted at a fixed location near the green 205.

In one embodiment, the virtual curve 218 is displayed in an augmented reality environment. As an example, as shown by FIG. 7A, the golfer may wear an augmented-reality head-mounted display (HMD) 216, such as augmented-reality eyeglasses 216, that permit light to pass through the lenses of the augmented-reality HMD 216 so that the golfer can see the physical surface of the green 205 and other objects, such as the hole 207 and flag 211. The augmented-reality HMD 216 may then generate an image of the virtual curve 218 corresponding to the optimal path such that the virtual curve 218 generated by the interface 50 appears to be superimposed on the physical surface of the green 205 seen by the golfer. Other techniques for providing feedback to the golfer about the optimal path are possible in other embodiments.

Figure 7C:
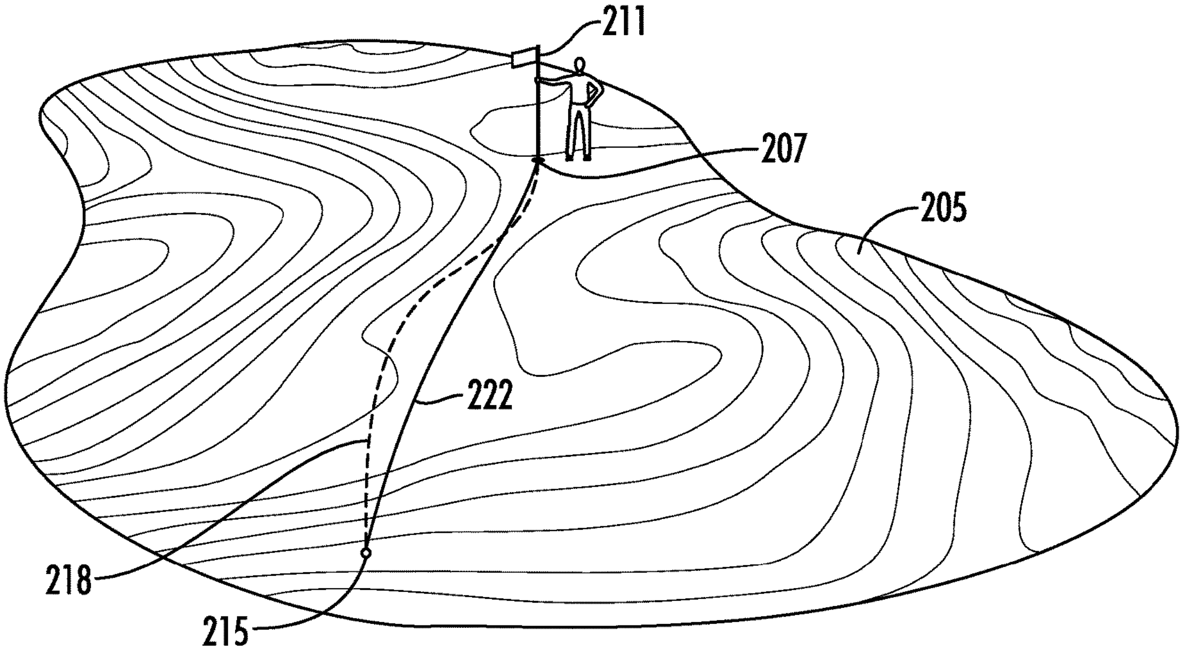
FIG. 7C depicts an image of the green of FIG. 7A displayed to a user for depicting multiple trajectories for a putt of a golf ball on the green.

In addition, it is possible for the processing system 46 to display multiple paths that can be selected by the user. In this regard, the path of a successful putt depends not only on green topology but also the pace of the golf ball during the putt. In this regard, a golf ball putted with a greater force tends to have greater momentum which may change the path that the ball must take to reach the hole when traversing across a sloped surface. Thus, for any given putt, there are typically multiple paths that would lead to a successful outcome depending on pace. The processing system 46 may display multiple virtual curves representing such paths and/or provide feedback indicative of the desired pace for a particular path. As an example, one virtual curve 222 may be color coded one color for a firm putt, and another virtual curve 218 may be color coded a different color for a soft putt, as shown by the image 220 depicted by FIG. 7C.

As described above, images captured by the sensor 44 of the drone 15 or by the sensor 44 residing at other locations may be displayed to the user wearing augmented-reality HMD 216. In such a situation, it may be desirable to change the viewpoint of the image so that it is relative to the location of the HMD 216 instead of the location of the sensor 44. To perform such conversion, the processing system 46 is preferably aware of the approximate location of the sensor 44 and the approximate location of the HMD 216. Using these locations, the processing system 46 can be configured to adjust the images captured by the sensor 44 so that they appear as if they have been captured by the HMD 216. In adjusting the images, the processing system 46 may be configured to change the orientation of the images to account for differences in the viewing angle of the sensor 44 relative to the viewing angle of the user through the HMD 216. As an example, the coordinates of the image may be converted into coordinates that are relative to the coordinate system used by the HMD 216 so that the displayed image has the proper perspective for viewing by the user wearing the HMD 216. In some embodiments, the sensor 44 may reside on the HMD 216 or be otherwise positioned such that such a conversion is unnecessary.

Note that there are various techniques that can be used for the processing system 46 to determine the locations of the sensor 44 and the HMD 216. As an example, it is possible for the sensor 44 to be a fixed location, such as mounted near the green, and the location of the sensor 44 may be stored in memory of the processing system 46. If the sensor 44 is on a drone 15, as described above, the drone 15 may have a location sensor, such as a global positioning system (GPS) sensor, for determine the location of the drone 15, and data indicative of this location may be transmitted to the processing system 46. In addition, the HMD 216 may be similarly equipped with a location sensor, and data indicative of the location of the HMD 216 can be transmitted to the processing system 46. Note that it is possible for the processing system 46 to reside on the HMD 216 or otherwise be situated on the user such that wireless communication of the HMD's location information is unnecessary. In other embodiments, it is possible to use radio frequency (RF) devices at known locations (e.g., fixed positions on the golf course) to communicate with the sensor 44, drone 15, and/or HMD 216 to determine their respective locations using triangulation or some other algorithm for determining locations of objects.

In soccer, the drone 15 may be positioned at a certain location relative to a particular player, such as the player in possession of the soccer ball, the goalie, a player taking a penalty or corner kick, or other player of interest, as described above for other sports. As an example, the drone 15 may be positioned a certain distance (e.g., about 10 feet) behind the player at a certain height (e.g., about 10 feet) above the playing surface. Alternatively, the drone 15 may be positioned on the side of the soccer field (e.g., the drone 15 may move up and down the sidelines). As described above for other sports, the drone 15 may be moved based on the captured images to keep the drone 15 at a certain position relative to the player of interest. In one embodiment, the position of the drone 15 is controlled based on the location of the soccer ball. As an example, the drone 15 may be controlled to hover over the ball at a certain height (e.g., about 10 feet) and move in conjunction with the ball so that the drone 15 continues to hover over the ball or at another predefined position relative to the ball. As described above for other sports, the processing system 46 may be configured to collect ball and player data based on the captured images, to determine ball trajectory for various kicks, and to determine various parameters indicative of the player performance.

In tennis, the drone 15 may be positioned at a certain location relative to a particular player of interest, as described above for other sports. As an example, the drone 15 may be positioned a certain distance (e.g., about 10 feet) behind the player at a certain height (e.g., about 10 feet) above the playing surface. Alternatively, the drone 15 may be positioned on the side of the tennis court (e.g., the drone 15 may move up and down the sidelines). As described above for other sports, the drone 15 may be moved based on the captured images to keep the drone 15 at a certain position relative to the player of interest, and the processing system 46 may be configured to collect ball and player data based on the captured images, to determine ball trajectory, and to determine various parameters indicative of the player performance.

If desired, multiple drones 15 may be used to monitor gameplay. As an example, multiple drones 15 may be used to track different players at the same time, according to the techniques described above. Furthermore, additional drones 15 and/or sensors may be positioned at various locations to provide additional viewpoints. The processing system 46 may be configured to stitch together multiple images from multiple drones 15 or sensors at different locations in order to provide a larger, composite image of gameplay.

When multiple drones 15 are used, the drones 15 may implement collision avoidance algorithms, as described above, in an effort to avoid each other. In this regard, one drone may have a sensor 44 (such as a proximity sensor) for detecting another drone 15, and control its flight path based on such sensor in a manner to avoid the other drone 15. In one embodiment, the drones 15 are configured to communicate with each other wirelessly in order help avoid collisions. As an example, the drones 15 may communicate location information to each other. For example, a first drone 15 may transmit its location coordinates to a second drone 15, which uses such coordinates to determine the location of the first drone 15 so that it can control its flight path to avoid the first drone 15. In another example, when a collision between two drones 15 is determined to be imminent, one of the drones 15 can transmit information of its intended flight path to the other drone 15, which uses such information to select a flight path that avoids a collision. Thus, when a first drone 15 determines to take evasive maneuvers to avoid a second drone 15, the second drone 15 may be aware of the flight path of the first drone 15 that will result from the evasive maneuvers thereby helping the two drones to avoid each other.

As described above, there are various techniques that may be used to control the drone 15, and such control may be autonomous, semi-autonomous, or manual. In addition, decisions on which sensors 44 to enable or use can be made at any time and can be autonomous, semi-autonomous, or manual. Sensor calibration and position finding may also be autonomous, semi-autonomous, or manual. The processing system 46 may include one or more user interfaces for receiving user inputs that are converted into commands wirelessly transmitted to the drone 15. It is possible for a single user to provide such inputs or for the control to be dispersed across a number of users. As an example, control may be handed off from one operator to another, and the operators may be at the same premises or remote from each other. The inputs from the operators may be used to control the flight of the drone 15 and/or other operational aspects, such as sensor attributes (e.g., the focal length of a camera.

When monitoring of an event is completed, the drone 15 may be returned or moved to a predetermined location for storage or other purposes. An operator could guide the drone 15 to such location, or the drone 15 can be configured to automatically fly or otherwise move the drone 15 to the location. As an example, coordinates of the predetermined location may be pre-programmed into the control logic 22, which is configured to provide inputs to the flight control system 52 such that the drone 15 automatically flies to the predetermined location.

As an example, the drone 15 may be stored at a base. At the base, the drone 15 may be connected to a power source, such as a battery or power outlet, in order re-charge one or more electrical power sources (e.g., batteries) on board the drone 15. When a person begins to perform a sporting activity of interest, the sporting activity may be sensed by a sensor 44 of the drone 15 or otherwise, and the drone 15 in response may automatically leave its base and fly to a position for monitoring the sporting activity, as described above. Once the sporting activity is finished or monitoring is otherwise no longer desired, the drone 15 may automatically fly back to its base or other location for storage.

As an example, assume that the drone 15 is to be used to monitor basketball players while practicing. When a player arrives at a basketball court and begins to dribble or shoot on the basketball court, a sensor 44 of the drone 15 or other sensor (e.g., a sensor mounted at a fixed location close to the court) may detect the sporting activity (e.g., dribbling or shooting), may detect the presence of the player at or near the court, or may receive an input from the player or other user indicating that monitoring is to commence. In response to any of these events, the drone 15 may automatically fly to a desired location for monitoring the sporting activity and begin monitoring as described above.

In this regard, the drone 15 may find certain references to assist with monitoring of the sporting activity. As an example, the drone 15 may identify the player and then fly to a predefined location relative to the player being monitoring. In another example, the drone 15 may find a portion of the basketball court, such as a hoop on the basketball goal or court markings, and fly to a predefined position relative to the hoop, other portion of the basketball goal, or court markings. Yet other techniques for orienting and positioning the drone 15 in or near the playing space are possible.

Once the player has stopped the sporting activity for at least a predefined amount of time, has left a certain proximity (e.g., left the court), or has otherwise indicated that monitoring is to stop (e.g., provided a user input), the drone 15 may then automatically return to the base or other location for storage until the next event for monitoring occurs. Similar techniques may be used for monitoring other types of activities for basketball or other sports.

Information collected by the drone 15, including images or other sensor data captured by the drone 44, may be provided to users as part of a subscription of a service. As an example, the information may be wirelessly transmitted from the drone 15 to the processing system 46, which stores the information in memory, such as at a database accessible by a plurality of subscribers. Access to the information may be controlled by a server that is in communication with a network, such as the Internet. As part of the service, the subscribers may access the server through the network and download the information from the server. As an example, a video stream of images captured by the drone 15 may be streamed from the server to one or more users. Such video stream may be delivered in real-time as the sporting event is occurring, or the video data may be stored at the server for later (e.g., on-demand) access by subscribers. Other types of information collected by the drone 15 may similarly be delivered in real-time or stored for later access by subscribers. If desired, the collected information may be curated for social media use.

In addition, information collected by the drone 15 may be used as input for video games, including virtual reality video games and augmented reality video games. For example, movements of the athletes and other objects (such as football players and the football in a football game) may be captured and recorded by the drone 15. Such information may then be used to recreate an animation of such movements as part of a video game or other viewing by users. Using a head-mounted display (e.g., virtual-reality or augmented-reality eyeglasses) or other type of display, images of the athletes and other objects in the sporting event may be displayed to the user to generate a virtual-reality or augmented-reality environment in which the user may participate. As an example, for a football game, a user may go to a football field and use a head-mounted display, which permits the user to see the actual football field while projecting images of the recorded athletes into the user's eyes so that the user sees images of the athletes as if the sporting event is occurring on the football field where he is located. Alternatively, an image of a virtual football field may be projected such that the user sees the images of the athletes as if they are playing on the virtual football field. The system may be interactive such that, as the user takes action within the video game, gameplay is affected. For example, if the user moves within the virtual or augmented reality environment close to a ball carrier, the image of the ball carrier might be updated to reflect that he is tackled. Similar techniques may be used to provide video games for other types of sports.

As indicated above, the sensors 44 may include a video camera for capturing images of a scene, such as frames of video images that can be streamed to one or more users. In some embodiments, the drone 15 may have at least one multi-lens camera for capturing panoramic images of a wide viewing angle, such as greater than 180°. As used herein, a "multi-lens" camera refers to a camera that has multiple lenses for receiving multiple images and that stitches together or otherwise combines images from multiple lenses to form a composite image having a viewing angle greater than the images receive by any one of the lenses. It is possible to implement such a multi-lens camera using multiple cameras by communicatively connecting the cameras to a processing system that stitches the images from the cameras to form a composite image. In at least one embodiment, the drone 15 has a multi-lens camera capable of capturing 360° panoramic views, sometimes referred to as a "360° camera," but other types of cameras and images are possible. As an example, 360° cameras have been developed that provide 360° panoramic view without stitching, and the drone 15 may use such a camera, if desired. Cameras having wide horizontal viewing angles, such as about 180° degrees or greater, shall be referred to herein as "wide-angle" cameras regardless of whether stitching is used. Such wide-angle cameras, when worn by a user, may be used to capture images of objects on opposite sides of the user, such as objects in front of and behind the user.

In some embodiments, the drone 15 also has at least one depth sensor 47 that is configured to capture a panoramic depth image of the same or similar view relative to the wide-angle camera described above. This panoramic depth image may have a wide viewing angle, such as greater than 180°. In one embodiment, a two-dimensional (2D) video camera provides a panoramic image with a viewing angle up to 360° while the depth sensor 47 provides a corresponding depth image that has the same or similar viewing angle and can be used to determine the depths of objects that appear in the image from the 2D wide-angle camera. As described above for panoramic video images, images from multiple lenses of the depth sensor 47 may be stitched together to form a composite depth image, but for some depth sensors 47, stitching may be unnecessary to achieve a wide-angle view.

In some embodiments, the athletes of a sporting event being monitored by the drone 15 wear at least one wide-angle camera, which provides panoramic video images from the viewpoint of the user wearing such camera. Image data from the camera may be wirelessly transmitted to the drone 15 and/or the processing system 46. Like the image data from a camera on the drone 15, image data from the wide-angle camera on the user may be stored and displayed by the processing system 46 for viewing by subscribers or other users. In other embodiments, other types of cameras may be worn by the user, as may be desired. Note that such a camera may be worn by an athlete to provide video images from the perspective of the athlete without the use of the drone 15.

Various techniques may be used to attach a wide-angle camera to a user, such as an athlete in a sporting event. In one embodiment, the wide-angle camera has a plurality of cameras, referred to as "component cameras," each of which has a smaller viewing angle than the panoramic image provided by the wide-angle camera. Each component camera captures an image of a sector within such camera's view and sends the image to a processing system, which stitches together such images to form a wide-angle panoramic image, such as a panoramic image having a 360° viewing angle. As an example, there may be three component cameras where each component camera captures an image having a viewing angle of approximately 120° in order to form a combined image having a 360° viewing angle. In other embodiments, other numbers of component cameras with different viewing angles are possible.

In one embodiment, each component camera is mounted on a base that can be attached to a user. As an example, the base may be a band (e.g., a ring) that fits around a body part of a user to secure the base and, therefore, the components to the user. Such a band may be rigid or elastic. As an example, the band may be worn around the user's torso (e.g., chest, waist, or hips), arm, leg, or head. For football or baseball, the band may fit around the helmet of a football or baseball player. If desired, the component cameras and/or band may be integrated with (e.g., embedded within) the helmet or other headgear. Regardless of the techniques used to secure the component cameras to the user, the component cameras may form a ring of cameras capable of capturing images from opposite sides of the user, such as images from the user's front and back. For water polo, a ring of cameras may be positioned on the user's swim cap. In other sports, a ring of cameras may be mounted on other types of headgear, such as caps (e.g., baseball), hats, helmets, headbands (e.g., soccer or basketball), etc. In other embodiments, a ring of component cameras may be positioned around other body parts, as described above.

If desired, multiple rings of component cameras may be used. As an example, one ring of component cameras may be positioned around a user's head, and another ring of component cameras may be positioned around the user's torso. The panoramic image from one ring may be combined (e.g., stitched) with the panoramic image from the other ring to form a composite panoramic image. Alternatively, one ring of cameras may capture 2D images, and a ring of depth sensors may capture depth information for the captured images.

Figure 8:
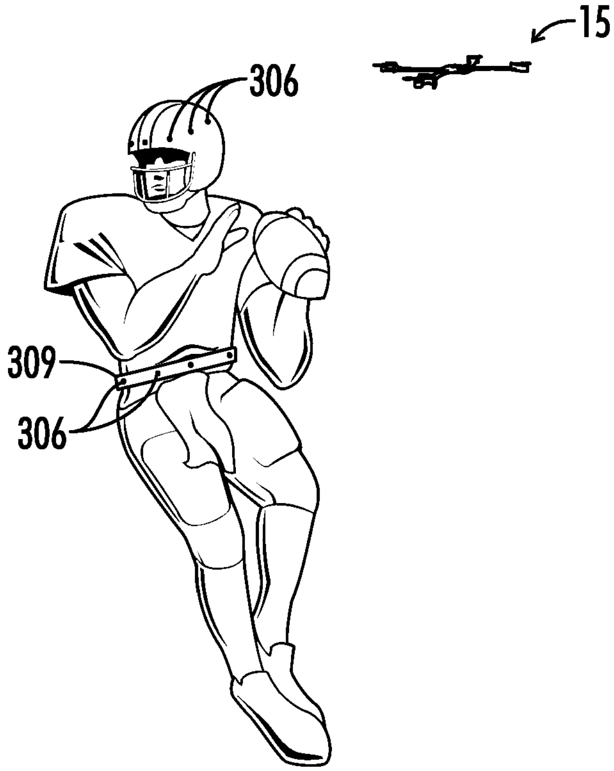
FIG. 8 is a three-dimensional perspective of the football player of FIG. 5 while the football player is wearing at least one multi-lens camera.

As an example, FIG. 8 shows a football player having a multi-lens camera (e.g., a plurality of component cameras) embedded in a helmet 301 of the football player. The component cameras may be positioned on an interior of the helmet 301 such that they are not visible in FIG. 8. Each of the component cameras may have a lens 306 that passes through the helmet 301, is positioned on an exterior surface of the helmet 301, is positioned to receive light through a hole in the helmet 301, or is otherwise positioned on the helmet 301 to receive light from a scene that includes other players at the sporting event. In the embodiment of FIG. 8, the lenses 306 are arranged in a ring around the helmet 301. A wireless communication interface may also be coupled to the helmet 301 or otherwise positioned on the player to receive the images captured through the lenses 306 and to wirelessly transmit the images to the processing system 46, which may stitch or otherwise combine the images together form a composite image, such as a 360 degree view of the scenery around the player.

In FIG. 8, the player also has a band 309 around his waist. Component cameras may be embedded in the band 309 or otherwise coupled to the band 309. Each such component camera has a lens 306 that passes through the band 309, is positioned on an exterior surface of the band 309, is positioned to receive light through a hole in the band 309, or is otherwise positioned on the band 309 to receive light from a scene that includes other players at the sporting event. As with the component cameras coupled to the helmet 301, the component cameras coupled to the band 309 may provide captured images to a wireless communication interface that transmits the images to the processing system 46, which may stitch the images together form a composite image, such as a 360 degree view of the scenery around the player. In addition, the processing system 46 may stitch or otherwise combine the composite image derived from the component cameras coupled to the helmet 301 with the composite mage derived from the component cameras coupled to the band 309 to form a larger composite image, such as a larger 360 degree view of the scenery around the player. Note that other techniques for enabling a player to wear a multi-lens camera are possible. As an example, component cameras or lenses may be embedded or otherwise incorporated into the player's jersey and positioned around the player to provide a 360 degree view rather than using band 309, or the band 309 itself may be embedded or otherwise incorporated into the player's jersey. Yet other techniques are possible in other embodiments.

Figure 9:
FIG. 9 is a three-dimensional perspective of the basketball player of FIG. 6 while the basketball player is wearing at least one multi-lens camera.

FIG. 9 shows an embodiment in which a basketball player is wearing a band 321 around her head, similar to the band 309 of FIG. 8. In this regard, component cameras may be embedded in the band 321 or otherwise coupled to the band 321. Each such component camera has a lens 306 that that is exposed to receive light from a scene that includes other players at the sporting event. As with the component cameras coupled to the helmet 301, the component cameras coupled to the band 321 may provide captured images to a wireless communication interface that transmits the images to the processing system 46, which may stitch or otherwise combine the images together form a composite image, such as a 360 degree view of the scenery around the player.

Note that it is unnecessary for the component cameras to be rigidly coupled to one another or for one ring of component cameras to be rigidly coupled to another ring of component cameras. That is, it is possible for the orientation and/or location of one component camera to change during monitoring relative to the orientation and/or location of another component camera. In one embodiment a ring of component cameras for capturing 2D video images is used in conjunction with a ring of depth sensors 47 for capturing multiple depth images from the perspective of the athlete of the sporting activity. The depth images may be stitched or otherwise combined together to form a composite depth image that may be used to determine a distance of an object in any direction from the athlete. Using the depth image from one or more depth sensors 45, the playing surface plane can be identified to assist in determining the direction of gravity, as described in U.S. patent application Ser. No. 14/874,555.

In addition to capturing images from the perspective of an athlete in a sporting activity, the drone 15 may be used to capture images of the athlete wearing the wide-angle camera. This may help to gain an understanding of the athlete's thought's and state of mind. As an example, a camera on the drone 15 or a camera at another location may be used to capture images of the athlete's face, and such images can be analyzed to ascertain clues to the athlete's state of mind. For example, the direction that the athlete is looking can be determined and recorded. In addition, the athlete's facial expression can be analyzed in an effort to estimate the degree to which the athlete is panicked or focused. As an example, smiling may indicate that the athlete is relaxed, and rapid eye movement without a smile may indicate that the athlete is nervous or panicked.

The video images captured by the wide-angle camera may be used to provide a virtual reality or augmented reality environment to a user. From such video images, the user may be able to view the sporting event from the perspective of the athlete that is wearing the wide-angle camera. As an example, when the wide-angle camera is worn by a quarterback in a football game, the user viewing the video feed may be able to see, from the perspective of the quarterback, defensive lineman rushing the quarterback and receivers running routes. Using multiple rings of component cameras may help to increase the vertical viewing angle for the captured images. Also, using a wide-angle camera, it is possible to see lineman approaching the quarterback from many directions, such as in front of and behind (the quarterback's blindside) the quarterback. In other embodiments, the multiple rings may be used for other purposes. For example, as described above, at least one camera on one ring may provide two-dimensional video images while at least one depth sensor 47 on another ring may be used to provide depth information for the pixels captured by the camera.

Note that on a moving object, such as a drone 15, it is possible for the images from a camera to be used to determine depth without using a depth sensor 47. In this regard, if a stationary object (e.g., a line on a field or court, a basketball hoop or football goalpost) can be found in two images captured by a camera from two different viewpoints as it is moving, then it is possible to determine the depth to the object in the two images using triangulation or other similar techniques assuming that the velocity of the camera is known. In one embodiment, the processing system 46 is configured to determine its velocity based on flight sensors (e.g., airspeed and heading sensors) or otherwise (e.g., change in coordinates from a location sensor), to identify a stationary object in multiple images, and to use such information to calculate depth for the pixels of the images captured by the drone 15.

Using cameras on multiple athletes at a sporting event, as described above, may provide additional data to facilitate understanding of complex situations or provide more content for entertainment, training, or other purposes. As an example, in a football game, cameras may be attached to a quarterback and the receivers that are running routes. The cameras on the receivers could be used to capture images of defenders attempting to guard or "cover" the receivers. Based on the positions of the defenders relative to each receiver as determined from the images captured by the receivers' cameras and/or the quarterback's cameras, the processing system 46 may select one or more optimal receivers for receiving a pass from the quarterback.

Note that the receiver selection may be based on other factors, such as attributes about the defenders collected by the processing system 46 during gameplay or otherwise determined by the processing system 46. As an example, the processing system 46 may maintain data about each defender indicating various performance attributes about the defender, such as his peak speed, jumping height, reach, or other parameter indicative of the defender's ability, such as a subjective or objective rating, referred to hereafter as defender rating," indicative of the defender's effectiveness at covering receivers. Such data may be predefined (e.g., stored in the processing system 46 prior to gameplay or may be determined by the processing system 46 by monitoring the defenders during gameplay). Using such data, the processing system 46 may analyze the abilities of the defender and his relative location to a receiver to determine a value indicative of a probability that a pass thrown to the receiver will be completed.

For example, based on the separation distance between the receiver and the defender and a maximum vertical reach and/or jumping height of the defender, the processing system 46 may determine whether the defender is capable of blocking a pass thrown along a trajectory to reach the receiver as he is running down the field taking into account the fact that the receiver and the defender will likely continue to run during the pass until the ball reaches the receiver and/or defender. Based on the difference between the likely trajectory of the football and the vertical reach of the defender at a point where the football is likely to reach the defender, the processing system 46 may calculate a value, referred to hereafter as "completion indicator," indicating the probability that the pass will be completed. In this regard, a greater distance between the trajectory and the defender's vertical reach generally gives the quarterback a greater margin of error in attempting to complete the pass thereby increasing the probability that the pass will be successful.

The completion indicator may also be based on other factors. As an example, the completion indicator may be lowered for a defender that is rated higher than other defenders, as indicated by their respective defender ratings. The completion indicator may also be controlled based on how the defender previously performed in similar situations. As an example, during gameplay, the processing system 46 may track and store attribute data of a defender for each pass that he defends. Such data may include the separation distance between the defender and receiver at the time a pass is thrown and/or other data, such as whether the pass was completed, whether the defender is guarding the receiver's inside shoulder or outside shoulder, and the maximum speed difference between the defender and the receiver. The processing system 46 analyzes the attribute data to find situations similar to current set of play attributes and analyzes how the defender performed during the similar situations (such as the completion percentage for the identified situations). Based on such analysis, the processing system 46 may adjust the completion indicator accordingly. The completion indicator may be based on many other factors in other embodiments.

Note that the completion indicator may also be based on attributes associated with the receiver, such as the receiver's speed, jumping height, vertical reach, etc. Like the defender, the processing system 46 may maintain attribute data on the receiver and search such attribute data to determine how the receiver performed in similar situations in the past and adjust the completion indicator accordingly. In analyzing the attribute data, the outcome of similar situations involving the same defender and receiver may be weighted higher than outcomes of other situations.

The completion indicator is essentially an assessment by the processing system 46 of how likely it is that a pass directed to the receiver will be completed based on the relative locations of the defender and receiver and/or other factors, such as the abilities of the defender and receiver and the performance record of the defender and receiver in similar situations. Such completion indicator may be used by the processing system 46 to select an optimal receiver for catching a pass. As an example, the receiver associated with the highest completion indicator may be selected as the optimal receiver for catching a pass. In other embodiments, other techniques for selecting the optimal receiver or set of receivers for receiving a pass from the quarterback are possible.

After selecting one or more optimal receivers, the processing system 46 may transmit to a mobile device on the quarterback data indicative of the selected receivers to help the quarterback to select a receiver for receiving a pass during gameplay. As an example, headgear (a display device integrated with his helmet or eyeglasses worn by the quarterback) may display a graphic for identifying the receiver or receivers selected by the processing system 46 in an augmented reality environment. In this regard, the display device may project an image into the quarterback's eyes or on eyeglasses worn by the quarterback such that a graphical element appears to be superimposed on the selected receiver or receivers thereby indicating which receivers have been determined to be optimal for receiving a pass. In another example, an image may be projected such that a selected receiver or a portion of the football field corresponding to (e.g., at or close to) a selected receiver may appear to be highlighted or colored in a certain manner different than other portions of the football field. In other embodiments, other techniques for identifying the selected receivers are possible. Using the information from the processing system 46, the quarterback may select one of the receivers for the current play and throw the football to the selected receiver.

In addition to assisting the quarterback to select a receiver, the processing system 46 may assist the quarterback is selecting a suitable trajectory. In this regard, the processing system 46 may detect the location of defenders and, based on such locations, identify at least one trajectory for successfully completing a pass while avoiding defenders. Similar to the putting example described above, the identified trajectory or trajectories may be displayed to the quarterback in an augmented-reality environment where virtual curves show the identified trajectories. The quarterback may select one of the displayed trajectories and attempt to throw the football such that it follows the selected trajectory. As indicated above for putting, more than one trajectory may be displayed, and the trajectories may be color coded or otherwise marked based on the strength of the pass and/or the release angle, which both impact the trajectory of a pass.

In one embodiment, the trajectory or trajectories displayed to the quarterback are selected based on his performance assessed by the system in throwing previous passes. In this regard, by monitoring the quarterback's performance over time, the processing system 46 can learn performance limitations associated with the quarterback, such as the quarterback's arm strength (e.g., how fast or far the quarterback is capable of throwing a football). Based on such limitations, the processing system 46 may eliminate at least some trajectories that are deemed not to be feasible for the quarterback's capabilities. As an example, a trajectory that may require a loft (trajectory height) and distance exceeding the capabilities of the quarterback may be omitted from the trajectories displayed to the quarterback. Thus, the processing system 46 only displays to the quarterback trajectories that the quarterback is deemed capable of making based on prior throwing performance. Accordingly, the quarterback is more likely to select a trajectory that will result in a successful outcome (e.g., pass completion). In addition, based on several factors, such as the possible trajectories calculated for the pass and the quarterback's past performance, the processing system 46 may select a trajectory that is deemed to be optimal (e.g., result in the highest probability for a successful outcome). Such optimal trajectory may be color coded a different color than other displayed trajectories or otherwise highlighted by the processing system 46 such that the quarterback can easily discern which trajectory is deemed to be optimal.

Note that similar techniques may be used for other types of players. As an example, the possible trajectories of a field goal attempt may be displayed to a kicker. In addition to selecting or otherwise defining the possible trajectories based on the kicker's prior kick performance, as monitored by the system, the processing system 46 may also receive inputs indicative of meteorological conditions, such as wind speed, and compensate the trajectories for wind speed. As an example, a sensor mounted on the goalposts or otherwise positioned close to the goalposts may measure wind velocity and wirelessly transmit to the processing system 46 data indicative of the measured wind velocity, which may be used by the processing system 46 to calculate at least one kick trajectory. Thus, a kicker may see at least one trajectory, as adjusted for wind, in order to successfully kick the football through the goalposts. Such information may be useful for helping the kicker to adjust his kick in order to compensate for wind conditions. Further, the kicker may be informed that his longest possible trajectory is likely unable to reach the goalposts based on the distance to the goalpost, the current wind conditions, and the kicker's past kick performance. Such information may be useful for affecting certain game-time decisions, such as whether to attempt a field goal during gameplay.

In other embodiments, other techniques for assisting in decisions by athletes during gameplay are possible. As an example, in basketball, similar techniques may be used to analyze the locations of defenders relative to the locations of teammates, as well as the abilities of defenders and/or teammates or the performance of defenders and/or teammates in similar situations, to select and identify which teammate is optimal for receiving a pass. Note that the teammates' locations relative to the basketball goal may be used as a factor in selecting a teammate. For example, if multiple teammates are determined to be open for a pass, the teammate that is closest to the basketball goal may be selected for receiving the pass. Alternatively, if there is an unguarded teammate at the three point line, such teammate may be selected for receiving the pass even if there is an unguarded teammate closer to the basketball goal. The selection of a teammate for receiving a pass may be based on other factors, such as the teammate's past performance. As an example, by tracking the players over time, the processing system 46 may determine the shooting percentage of each player from different areas on the court. The teammate selected for receiving the pass may be based on such data. As an example, the processing system 46 may select the teammate that is (1) capable of successfully receiving a pass (as determined based on his location relative to the locations of defenders) and (2) is associated with the highest shooting percentage from his current location relative to the shooting percentages of the other teammates that are also capable of successfully receiving a pass.

It should be noted that the monitoring techniques described herein may be applied to participants of eSports, which generally refers to video game competitions pertaining to a sport. In an eSport event, participants typically play against each other in a video game featuring a particular sport, such as baseball, football, basketball, wrestling, street fighting, etc., while spectators watch the participants and gameplay. Like traditional sports, large numbers of spectators often attend or watch an eSport event. At least one camera may be positioned to capture a facial image of a participant of an eSport event. Such camera may be positioned on a drone 15, as described above, but other locations of the camera are possible in other embodiments. Such facial image may be analyzed to estimate the state of mind of the participant. In one embodiment, the facial images captured by the camera may be displayed within a video feed of the eSport event. As an example, the facial images may be shown to spectators at the event or located at a remote location from the event.

In addition, the video images may be analyzed by the processing system 46 to determine screen analytics, eye movement, and facial expression in an effort to ascertain the characteristics of good eSport players, including muscle memory, focus, and reaction time. Note that the video images may be displayed to the players, as may be desired. As an example, the face of one player (a "competitor") may be displayed to another player so that the other player may get a sense of the mental state of his competitor during gameplay. For example, video images of the competitor may be superimposed or otherwise combined with the video game images rendered to the player. Specifically, the video images of the competitor may be displayed within a window on the same display screen that is used to display the video game to the player. Alternatively, the video images of the competitor may be separately displayed so that it is viewable by the player during gameplay. As an example, the competitor may be displayed on a separate display screen or within an augmented-reality environment where the video game is displayed by a physical display unit (such as a desktop monitor or television) while the video images of the competitor are displayed by headgear (e.g., eyeglasses) worn by the player. Yet other techniques for displaying video images of the competitor are possible in other embodiments. Also, in addition to or in lieu of displaying video images of the competitor, data collected about the competitor may be displayed to a player according to the same or similar techniques.

Figure 11:
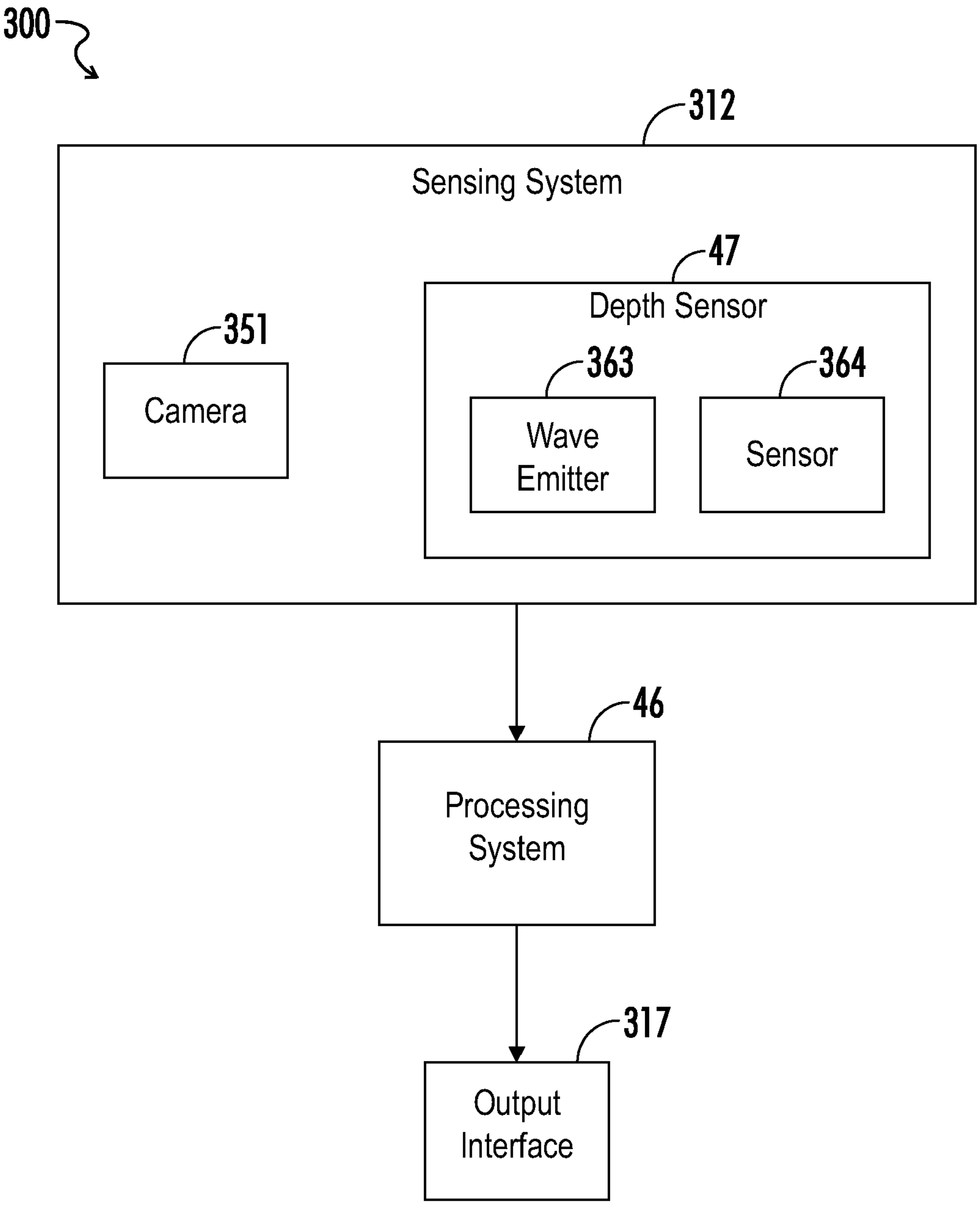
FIG. 11 is a block diagram illustrating an exemplary system for monitoring objects in athletic playing spaces.

FIG. 11 depicts an exemplary system 300 for monitoring objects in athletic playing spaces, such as football fields, soccer fields, basketball courts, etc. For illustrative purposes, the system 300 will be described in detail in the context of monitoring basketball players or basketballs as the players or basketballs are moving within the perimeter of a basketball court. However, the system 300 may be used for other sports, such as football, baseball, hockey, soccer, volleyball, tennis, golf, or any other sport or event in which it is desirable to track moving objects.

As shown by FIG. 11, the system 300 comprises a sensing system 312 that is communicatively coupled to a processing system 46. The sensing system 312 is configured to sense an object, such as a basketball player or basketball, that is moving within the athletic playing space, and to provide sensor data 49 indicative of the locations of the object as it moves. If desired, the sensing system 312 may reside on a drone 15, as described above, but it is possible for the sensing system 312 to be at other locations in other embodiments. As an example, the sensing system 312 may be implemented at a fixed location in the vicinity of a playing space, or the sensor sensing system 312 may be wearable such that it may be worn by a player participating in a sporting event. Yet other locations and configurations of the sensing system 312 are possible in other embodiments.

As described above, the processing system 46 is configured to receive the sensor data 49 and analyze the data 49 to determine performance parameters indicative of the performance of a player. As an example, the sensing system 312 may sense the locations of the player or a portion of a player's body, and the processing system 46 may analyze the sensor data to determine a velocity, acceleration, or displacement of the player or a portion of the player's body (such as a hand or elbow during a basketball shot). Various performance parameters and techniques for monitoring objects in athletic playing spaces are described by: U.S. Pat. No. 8,622,832, entitled "Trajectory Detection and Feedback System" and issued on Jan. 7, 2014, which is incorporated herein by reference; U.S. Pat. No. 8,617,008, entitled "Training Devices for Trajectory-Based Sports" and issued on Dec. 31, 2013, which is incorporated herein by reference; U.S. patent application Ser. No. 12/127,744, entitled "Stereoscopic Image Capture with Performance Outcome Prediction in Sporting Environments" and filed on May 27, 2008, which is incorporated herein by reference; and U.S. Pat. No. 8,948,457, entitled "True Space Tracking of Axisymmetric Object Flight Using Diameter Measurement" and issued on Feb. 3, 2015, which is incorporated herein by reference.

In one example, the processing system 46 identifies an object in free flight, such as a basketball that is traveling toward a hoop of a basketball goal during a basketball shot, and determines the object's locations in 3D space for a series of image frames. Each such determined location shall be referred to herein as a "measured trajectory point." Based on the measured trajectory points, the processing system 46 determines a trajectory curve representing a path of movement of the object for the purpose of calculating one or more performance parameters. As an example, based on the determined trajectory curve, the processing system 46 may estimate the object's angle of entry into a hoop of the basketball goal by determining the curve's angle relative to a horizontal plane defined by the hoop at a point that is close to the hoop (e.g., within a plane of the hoop). Note that the processing system 46 has a finite number of measured trajectory points depending on various factors, such as the frame rate of the camera 351 and the amount of time that the object is in view of the camera 351, and the processing system 46 may perform a curve fit algorithm or other type of algorithm in the trajectory analysis in order to smooth the trajectory curve. The algorithm for estimating the trajectory of the object can be greatly simplified if the direction of gravity is known. Indeed, if the direction of gravity is known, the processing burden for estimating the trajectory curve can be reduced, and a more accurate trajectory curve can be determined with fewer measured trajectory points.

As shown by FIG. 11, the processing system 46 is communicatively coupled to an output device 317, such as a display device or an audio device (e.g., a speaker), that is controlled by the processing system 46 to provide feedback to the player indicative of the player's performance during a basketball shot or other activity. As an example, the processing system 46 may determine a performance parameter associated with a basketball shot, such as release height, release angle, velocity, acceleration, maximum shot height, location of shooter (e.g., horizontal distance of shooter from hoop when making a shot), make/miss status, or entry angle or velocity of the basketball into a hoop of a basketball goal. Such performance parameter may be communicated to the player via the output device 317. If desired, the processing system 46 may communicate with the output device 317 through a network (not shown in FIG. 11), such as the Internet or a LAN.

In one exemplary embodiment, the processing system 46 uses the make/miss status or other information in order to determine various statistics that may be useful for characterizing the shooter's skill level over a plurality of shots. As an example, the processing system 46 may count the total number of shots that a particular shooter takes and also count the total number of shots made. The processing system 46 may then calculate a performance parameter based on both counts. As an example, the processing system 46 may calculate the percentage of shots made by dividing the total number of made shots to the total number of shots taken.

Note that a user sometimes makes a shot without the ball entering the hoop directly. As an example, a ball may strike the hoop and bounce upward before ultimately falling through the hoop for a made basket. Such shots that bounce off of the hoop in an upward direction but ultimately pass through the hoop shall be referred to herein as "non-guaranteed makes." For a non-guaranteed make, it is possible for the basketball to bounce off of the hoop several times before ultimately passing through the hoop. For other shots, sometimes referred to as "swish" shots, the basketball may pass through the hoop without touching the hoop. For yet other shoots, the basketball may contact the hoop as it passes downward through the hoop without bouncing off the hoop in an upward direction. Shots for which the basketball passes through the hoop without bouncing off the hoop in the upward direction shall be referred to herein as "guaranteed makes." Note that guaranteed makes include swish shots for which the basketball does not contact the hoop, as well as shots for which the basketball contacts the hoop on its way down through the hoop without bouncing off the hoop in an upward direction (i.e., away from the floor of the court).

It is believed that the number of guaranteed makes may be a better indicator of skill level than the number of total made shots. In this regard, a player that has a higher percentage of guaranteed makes tends to be a more consistent and better shooter. Moreover, during any given sample period, a lower skill player may appear to be a better shooter than his or her actual skill level due to an inordinate number of non-guaranteed makes, which have less predictable outcomes relative to guaranteed makes. Moreover, the total number of guaranteed makes or a parameter based on the total number of guaranteed makes may constitute one or more of the performance parameters calculated by the processing system 46. As an example, the processing system 46 may calculate the percentage of guaranteed makes by dividing the total number of guaranteed makes counted during a sample period by the total number of shots attempted by the same player during the sample period. In other embodiments, other parameters based on the number of guaranteed makes counted by the processing system 46 are possible.

Note that a performance parameter based on the number or percentage of guaranteed makes may be reported as feedback to a user. In one embodiment, a performance parameter based on the guaranteed makes counted by the processing system 46 is used to determine a skill level for the player. In this regard, as part of the feedback, the processing system 46 may provide a skill level assessment for a particular player. Such skill level assessment may be qualitative or quantitative in nature. As an example, the assessment may have various qualitative levels, such as "poor," "good," "great," and "expert," and the processing system 46 may use the total number of guaranteed makes during a sample period at least as a factor in selecting which level is appropriate for the player. In this regard, a higher percentage of guaranteed makes generally results in the selection of a higher-skill level according to a predefined algorithm for selecting skill level. The skill level assessment may also be quantitative in nature, such as a score from 0 to 100 (or some other range). Generally, the player is assigned a higher score when he or she has a higher percentage of guaranteed makes, noting that the score may also be based on other factors. In any event, the processing system 46 distinguishes between guaranteed makes and non-guaranteed makes and ultimately assigns the player a skill level assessment based at least on the number of guaranteed makes counted for the player during a sample period.

If desired, the processing system 46 may store data indicative of the performance parameters in memory 125 or transmit such data to another device for storage or analysis. Such data may be analyzed at a later time for providing feedback, as described herein, or for other purposes such as for providing information on the play of the game. As an example, the position of the ball may be compared to the position of an object associated with the playing space, such as a goal or a boundary, to determine whether the ball crossed or reached the object. Various other uses of the data processed by the processing system 46 are possible in other embodiments.

In one example for which the system 300 is used in basketball, the processing system 46 is configured to identify a three-point line in the captured images. As known in the art, a three-point line is generally an arc that extends from the baseline of a basketball court to the top of the key and back to the baseline. The processing system 46 also identifies a shooter that is shooting a basketball near the three-point line. For example, by tracking the relative locations of athletes to the basketball, the processing system 46 can determine when one of the athletes shoots the basketball toward a hoop. The processing system 46 is configured to identify the feet of such shooter and to determine whether both of his feet are on a side of the three-point line in a three-point zone (i.e., a zone of the basketball court outside of the area between the three-point line and the baseline) where shots are worth three points. Based on the relative locations of the shooter's feet and the three-point line, the processing system 46 determines a performance parameter indicating whether the shot is a three-point shot. If any portion of his foot is on or inside the three-point line, the processing system 46 determines that the shooter is not taking a three-point shot. Otherwise, the processing system 46 determines that the shooter is taking a three-point shot. In such an embodiment, a referee or other user may utilize feedback indicative of the performance parameter to determine whether to award three points for the basketball shot.

In the context of football, the location of the football may be compared to a boundary line, such as the goal line, in order to determine whether any portion of the football reaches or crosses the goal line. That is, based on the images captured by the sensing system 312, the processing system 46 may automatically determine whether a touchdown is scored. In such an embodiment, a referee or other user may utilize feedback from the system 300 in order to determine whether to award points for the football reaching or crossing the goal line. In other embodiments, yet other decisions may be made based on comparisons of objects to markings on the playing surface 382.

Note that the processing system 46 may be coupled to the sensing system 312 and/or the output device 317 via physical connections (e.g., wires) or wirelessly. In one exemplary embodiment, the sensing system 312 is mounted on a basketball goal, as will be described in more detail hereafter with reference to FIG. 3, and wirelessly transmits sensor data to the processing system 46, and the processing system 46 may comprise a computer system, such as a desktop, laptop, or handheld computer, which may be integral with the output device 317. As an example, a software application on a smartphone or laptop may implement the functionality described herein for the processing system 46, which may be implemented in hardware or any combination of hardware, software, and firmware. A smartphone may have a touch-sensitive display or speaker that is used to implement the output device 317 for providing visual output to the player or other user. In other embodiments, it is unnecessary for the processing system 46 to be integral with the output device 317. As an example, the output device 317 may be implemented via a display screen or an audio device of a smartphone, and the processing system 46 may wirelessly transmit feedback information to the smartphone, which renders the feedback information to a user via the output device 317. In another embodiment, the output device 317 may be a peripheral device connected to the processing system 46. Yet other configurations are possible in other embodiments.

Figure 12:
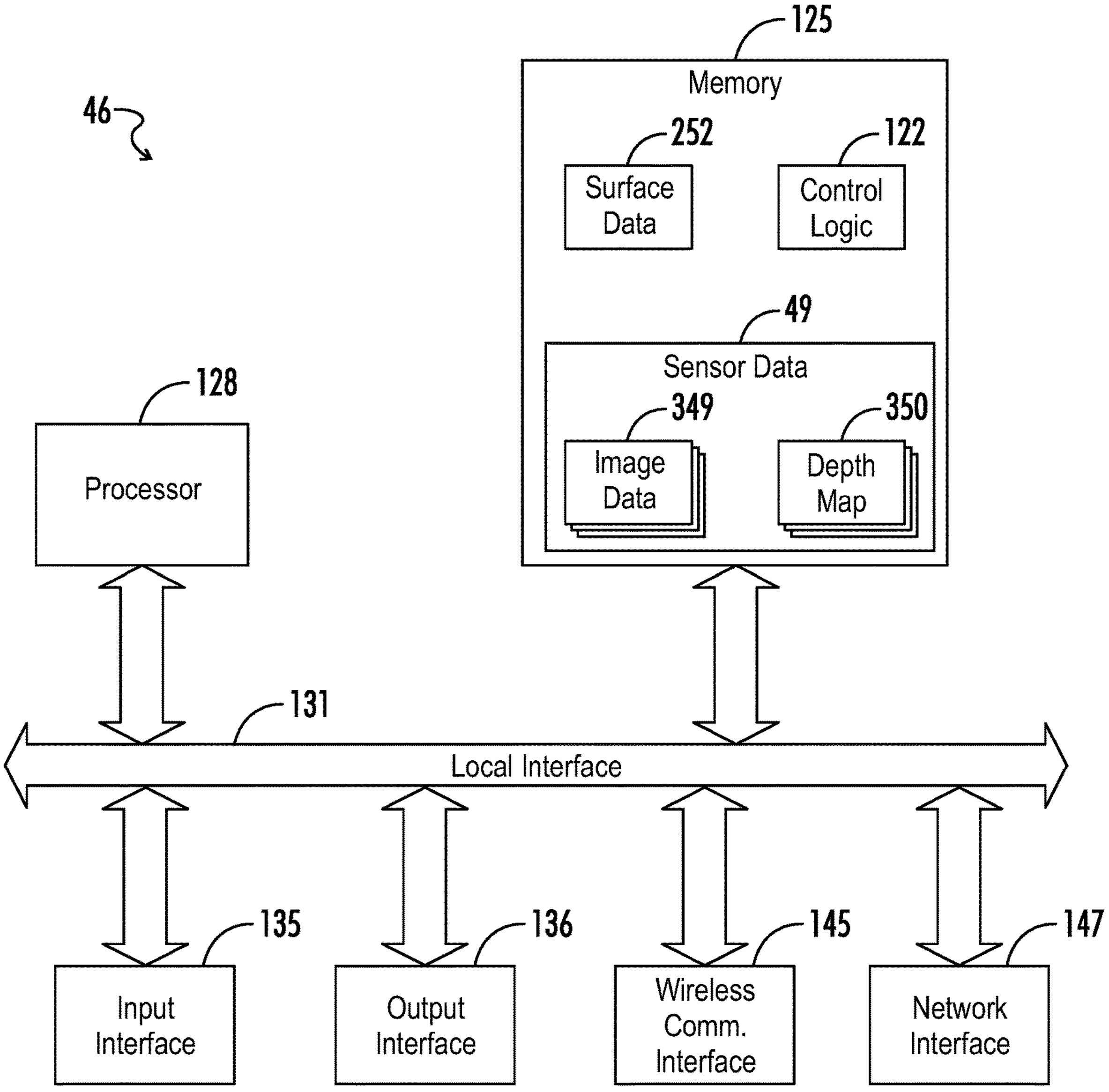
FIG. 12 is a block diagram illustrating an exemplary processing system, such as is depicted by FIG. 11.

FIG. 12 depicts the processing system 46 for an embodiment in which the processing system 46 process information for tracking the performance of one or more players at an athletic playing space and determining a direction of gravity within the athletic playing space, as will be described in more detail below. In the exemplary embodiment shown by FIG. 12, the sensor data 49 comprises image data 349 from a camera (not shown in FIG. 12) and a depth map 350 from a depth sensor (not shown in FIG. 12), but other types of sensor data 49 may be used in other embodiments.

If desired, the sensing system 312 (FIG. 11) may include any sensor for assisting with the operation and algorithms of the processing system 46. As an example, an accelerometer or other type of motion sensor may be used to provide input regarding movement of the sensing system 312 or a component of the sensing system 312, such as the camera 351. In addition, one or more orientation sensors, such as tilt sensors or gyroscopes, may be used to provide information about the orientation of the sensing system 312 or a component of the sensing system 312, such as the camera 351. Known algorithms may be used by the control logic 122 in order to determine the direction of gravity based on accelerometer readings or other types of readings from motion sensors, orientation sensors, or other types of sensors. As will be described in more detail below, the control logic 122 may determine the direction of gravity based on one or more accelerometers or other types of sensors and use this information to assist with its operation.

Various types of sensing systems 312 may be used to sense the object being monitored. In one exemplary embodiment, as shown by FIG. 11, the sensing system 312 comprises a camera 351 and a depth sensor 47. The camera 351 is configured to capture video images of the playing spacing including images of the object being monitored and to provide image data 349 defining frames of the captured images. In one embodiment, the images are two dimensional, and the depth sensor 47 is used to sense depth or in other words a distance from the sensor 47 to an object in the image. In this regard, for each frame of image data 349, the depth sensor 47 provides a depth map indicating a respective depth for each pixel of the image frame. Note that the depth sensor 47 may be oriented such that the distance measured by the depth sensor 47 is in a direction that is substantially normal to the plane of the 2D coordinate system used by the camera 351, although other orientations of the depth sensor 47 are possible in other embodiments.

Various types of cameras 351 and depth sensors 47 may be used to implement the sensing system 312. In one exemplary embodiment, the sensing system 312 is implemented using a KINECT® camera system sold by Microsoft Corporation. In such a system, the camera 351 and depth sensor 47 are integrated into the same housing 355 (FIG. 3). The camera 351 is configured to capture a video stream comprising frames of video data in which each frame is defined by a plurality of pixels. Each pixel is associated with two coordinates, an x-coordinate and a y-coordinate, representing a location in 2D space. For each frame, each pixel is assigned a color value (which may include a red component (R) value, a blue component (B) value, and a green component (G) value) indicative of the color of light received by the camera 52 from the location in 2D space corresponding to the pixel's coordinates. Further, for each pixel, the depth sensor 47 measures the distance from the sensor 47 to the real world object that is at the pixel's corresponding location in 2D space. Such distance (which, as described above, may be in a direction substantially normal to the plane of the 2D coordinate system used by the camera 351) may be referred to as the "depth" of the corresponding pixel. Using the image data from the camera 351 and the depth data from the depth sensor 47, the location of an object captured by the camera 351 can be determined in 3D space. That is, for a point on the object, its x-coordinate and y-coordinate from the image data provided by the camera 351 indicate its location along two axes (e.g., the x-axis and y-axis), and the point's depth value from the depth sensor, which may be referred to as the "z-coordinate," indicates its location along a third axis (e.g., the z-axis). Notably, the coordinate system defined by the three axes is not relative to gravity. That is, depending on the orientation of the system 312, gravity may be in any direction relative to the axes of the coordinate system. Thus, unless a calibration process is performed, the direction of gravity relative to the coordinate system is unknown.

In a Kinect® camera system, the depth sensor 47 comprises a wave emitter 363 (e.g., an infrared laser projector or other type of emitter) and a sensor 364 for sensing reflections of the energy emitted by the emitter 363. The emitter 363 emits infrared radiation at various wavelengths into free space, although radiation at other wavelengths outside of the infrared spectrum (e.g., visible light) may be emitted in other embodiments, and the sensor 364 senses the reflected energy to capture a video stream comprising frames of video data. Each frame of the depth data from the sensor 47 corresponds to a respective frame of image data from the camera 351. Further, a pixel of a frame of the depth data corresponds to (e.g., has the same x- and y-coordinates) and indicates the depth for at least one corresponding pixel in the image data from camera 351.

In this regard, for a frame of video data captured by the depth sensor 47, the depth sensor 47 converts the frame to a depth map 350 by assigning each pixel a new color value (referred to herein as "depth value") representative of the pixel's depth. Thus, when the depth map 350 is displayed, objects displayed as the same color within the image should be approximately the same distance away from the depth sensor 47, noting that it is often unnecessary for the depth map 350 to actually be displayed during operation.

As described above, a given pixel of the image data 349 from the camera 351 is associated with an x-coordinate and y-coordinate indicative of the pixel's location in 2D space, and the pixel is associated with a depth value from a corresponding pixel in the depth map 350 provided by the depth sensor 47 indicative of the pixel's z-coordinate. The combination of the x-coordinate, y-coordinate, and z-coordinate defines the pixel's location in 3D space relative to the coordinate system of the camera 351. That is, the x-coordinate, y-coordinate, and z-coordinate define the location of the point from which light measured for the pixel was reflected toward the camera 351 from an object.

The fact that the direction of gravity is unknown in the coordinate system of the camera 351 is not a drawback in many applications for the sensing system 312. However, when the sensing system 312 is used to estimate the trajectory of an object in free flight, as described herein, knowledge of the direction of gravity relative to the object's position is desirable in order to facilitate the process of estimating the object's trajectory.

In one exemplary embodiment, the control logic 122 is configured to automatically determine the direction of gravity relative to the locations indicated by the sensor data 49 in order to convert the data's coordinate system into a gravity-based coordinate system. As used herein, a "gravity-based" coordinate system is a coordinate system for which there is known relationship between the direction of gravity and the axes of the coordinate system such that the direction of gravity relative to any point indicated by the coordinate system can be determined. As an example, a gravity-based coordinate system may be defined such that the direction of gravity is parallel to an axis (e.g., z-axis) of the coordinate system, though it is possible for other relationships to exist between the direction of gravity and the axes of the coordinate system.

Figure 13:
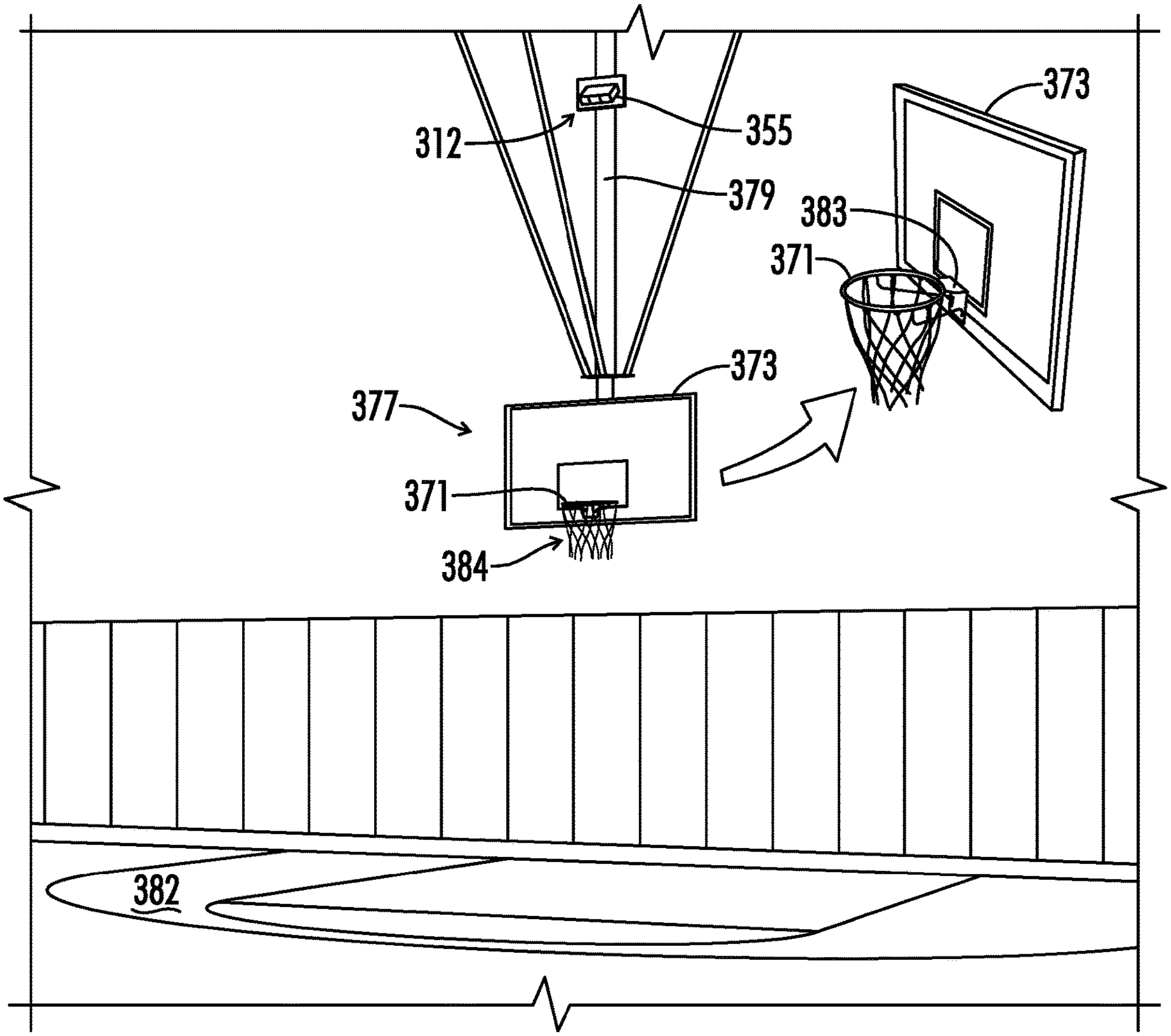
FIG. 13 shows an exemplary sensing system, such as is depicted by FIG. 11, mounted on a pole above a basketball goal.

Exemplary techniques for converting the sensor data 49 (e.g., image data 349 and depth maps 350) from a format relative to the coordinate system of the camera 351 into a format relative to a gravity-based coordinate system will be described in more detail below. In one embodiment, the sensing system 312 is positioned such the camera 351 and depth sensor 47 have a broad view of the athletic playing space, including the playing surface (e.g., surface of a field or court) on which the athletic activity is played. For example, in basketball, the sensing system 312 may be mounted such that the camera 351 and depth sensor 47 are positioned above the hoop of a basketball goal with a view of the hoop and the floor of the basketball court. FIG. 13 depicts an exemplary embodiment in which the sensing system 312 is mounted above a hoop 371 and backboard 373 of a basketball goal 377. As an example, the goal 377, including the backboard 373 and hoop 371, may be mounted on one or more poles 379 that extend from a ceiling or wall of a building or other structure, and the sensing system 312, including the camera 351 and depth sensor 47, may be mounted on at least one such pole 379 above the backboard 373. As shown by FIG. 13 the hoop is coupled to the backboard 373 by a bracket 383, and a net 384 may be coupled to and hang from the hoop 371.

Further, the sensing system 312 may be oriented such that the camera 351 and depth sensor 47 have a downward view that includes the hoop 371, as well as at least a portion of the playing surface 382 (which is the floor surface of the basketball court in the current example). When the sensing system 312 is so oriented, the camera 351 and depth sensor 47 capture images of the playing surface 382 and other objects, such as goal 377, within the athletic playing space, as shown by block 502 of FIG. 17.

Figure 14:
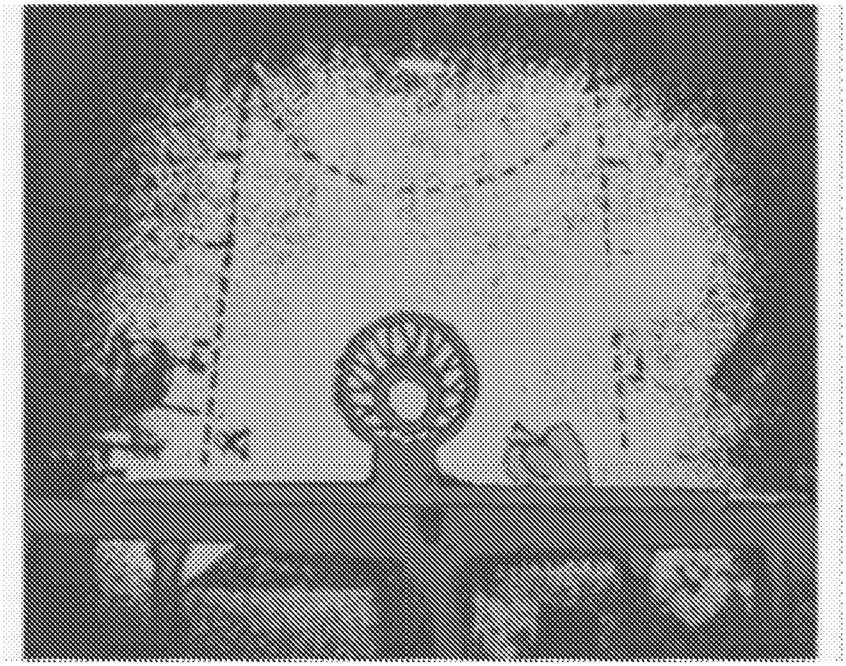
FIG. 14 depicts an exemplary depth map image captured by a depth sensor, such as is depicted by FIG. 11.

FIG. 14 shows an exemplary depth map image that may be captured by the depth sensor 47 in such an embodiment. In the depth map image shown by FIG. 14, the pixels are colored based on depth, as determined by the depth sensor 47. In this regard, the darker that a pixel's color is in the depth map 350, the smaller is the pixel's depth value. Thus, pixels corresponding to objects closer to the depth sensor 47 appear darker in color relative to pixels corresponding to object farther from the depth sensor 47. As an example, because the hoop 371 and backboard 373 are closer to the depth sensor 47 relative to the playing surface 382, pixels defining an image of the hoop 371 and backboard 373 are colored darker than pixels defining an image of the playing surface 382.

Figure 17:
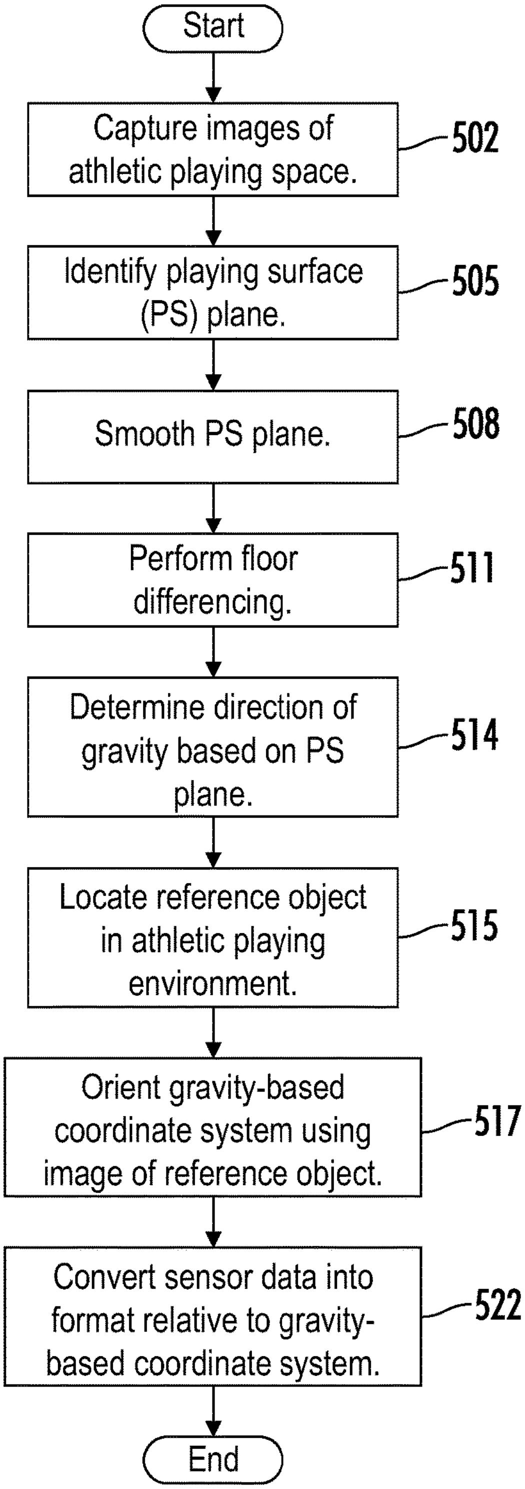
FIG. 17 depicts an exemplary process for calibrating a gravity-based coordinate system.

In one exemplary embodiment, the control logic 122 analyzes the depth map 350 in order to identify a playing surface (PS) plane within the image of the depth map 350, as shown by block 505 of FIG. 17. The PS plane generally refers to a plane that is parallel to the playing surface 382 (e.g., surface of a court or field) on which the athletic activity is played. In this regard, athletic activities are often played in wide, open spaces with relatively flat surfaces, such as fields or courts. Thus, a large number of pixels in the depth map should correspond to the playing surface 382 and, hence, be within the same plane. For example, when the sensing system 312 is mounted high above the playing surface, a significant portion of an image may correspond to the playing surface, and the pixels corresponding of the playing surface may have color values within a relatively narrow color range. Moreover, the control logic 122 is configured to analyze the depth map 350 to identify planes. That is, the control logic 122 is configured to identify at least one set of depth pixels that are within the same plane. When the sensing system 312 is mounted high above the playing surface, planes can be identified by finding groups of contiguous depth pixels having similar color values. However, other techniques may be used in other embodiments. As an example, the surface geometry of an object within view of the camera 351 can be analyzed based on the depth pixels in order to identify depth pixels that are within the same plane. Thus, it is unnecessary for the pixels in the same plane to have the similar depths in order to be in the same plane.

As an example, in a volleyball game, one or more sensing systems 312 may be mounted on one or more sides of the volleyball court such that a sensing system 312 is below the net of the volleyball court. In such an embodiment, the view of the floor of the volleyball court may be closer to a horizontal perspective than a vertical perspective such that depth pixels corresponding to the floor of the volleyball court may have significantly different depth values as the floor extends away from the sensing system 312.

Some objects, such as portions of the goal 377, may have flat surfaces from the perspective of the depth sensor 47, but the size of a flat surface of the goal 377 within the view of the depth sensor 47 is likely to be much smaller than the size of the playing surface 382. For each set of depth pixels defining a plane, the control logic 122 may determine the total number of depth pixels within the plane and compare this number to a threshold. If the number is below the threshold, the control logic 122 may determine that the pixel set does not correspond to the playing surface 382. That is, the size of the plane represented by the pixel set is too small to be representative of the playing surface 382. The pixel set having the greatest number of depth pixels above the threshold within the same plane may be identified by the control logic 122 as the pixel set corresponding to the playing surface 382, referred to hereafter as the "floor planes (FP) pixel set."

Note that various sensors may be used to assist with identification of the FP pixel set defining the PS plane. As an example, as described above, one or more accelerometers or other types of sensors may be used to determine the approximate direction of gravity, and such information may be used to filter the planes identified by the control logic 122 in order to eliminate planes that are not within a predefined range of the direction of gravity, as determined by the foregoing sensors. As an example, only pixel sets defining a plane that is substantially perpendicular to the direction of gravity, as determined by one or more accelerometers or other sensors, may be eligible for selection as the FP pixel set. Once the FP pixel set is identified, it may be used to make a more precise measurement of the direction of gravity according to the techniques described herein.

Due to errors in estimating the pixel depths by the depth sensor 47 or other factors (such as curvature, if any, of the playing surface), the FP pixel set in some cases may not define a perfect plane. The control logic 122 is configured to perform a mathematical smoothing operation on the FP pixel set in order to remove outliers far away from the FP pixel set, as shown by block 508 of FIG. 17. In one exemplary embodiment, Random Sample Concensus is used to implement the mathematical smoothing operation, but other types of smoothing operations may be used in other embodiments.

In addition to the smoothing operation, the control logic 122 also performs an algorithm, referred to herein as "floor differencing," in an effort to remove depth pixels that are out of the PS plane but closer to the PS plane than the outliers removed by the smoothing operation, as shown by block 511 of FIG. 17. In this regard, after performing the smoothing operation, the control logic 122 analyzes the FP pixel set in order to estimate the initial location and orientation of the PS plane, which will be referred to as the "initial PS plane." The control logic 122 then compares each depth pixel of the FP pixel set to the initial PS plane identified by the control logic 122. As an example, the control logic 122 may determine the difference between (1) the depth indicated by the depth pixel and (2) the depth of the point on the initial PS plane that is closest to the depth indicated by the depth pixel. If the difference is greater than a predefined threshold (TH), then the control logic 122 removes the depth pixel from the FP pixel set. Thus, by performing the floor differencing, depth pixels that are associated with locations greater than a threshold distance away from the initial PS plane are removed from the FP pixel set.

After performing floor differencing, the control logic 122 again analyzes the FP pixel set in order to estimate the location and orientation of the PS plane indicated by the modified FP pixel set, thereby identifying the PS plane that is to be used for converting the sensor data 49 into a format relative to the gravity-based coordinate system. In this regard, the control logic 122 may determine that the direction of gravity is perpendicular to this identified PS plane, as shown by block 514 of FIG. 17.

Before the sensor data 49 is converted, the control logic 122 is configured to select an origin for the gravity-based coordinate system and to define three axes: an x-axis, a y-axis, and a z-axis. These axes are perpendicular to each other, and each axis is defined to pass through the origin. In one embodiment, the x-axis and y-axis are defined to be parallel to the identified PS plane, and the z-axis is defined to be perpendicular to the PS plane and, therefore, parallel with the direction of gravity. In other embodiments, other orientations of the axes relative to the direction of gravity and the PS plane are possible.

In order to facilitate calculations of performance parameters, the control logic 122 is configured to define a relationship between the gravity-based coordinate system and the athletic playing environment. As an example, in order to determine the angle of entry of a basketball into a hoop 371, the control logic 122 should be aware of the locations of the basketball relative to the hoop 371 as it is traveling along a trajectory. This may be achieved by determining a relationship between at least one reference point in the gravity-based coordinate system, such as the origin, and at least one reference point in the athletic playing environment. By doing so, the location of any object sensed by sensing system 312, such as a player or basketball, relative to other objects in the playing environments, such as a hoop 371, can be automatically determined.

Note that any point in the playing environment can be used as a reference for the gravity-based coordinate system. As an example, within the image data 349, it is possible to identify a boundary line or other court marking on the floor of a basketball court and use the identified marking to reference the gravity-based coordinate system to the playing environment. However, the types or styles of markings may vary from court-to-court. A basketball hoop 371, on the other hand, generally has a consistent size and shape, thereby facilitating identification of a hoop 371 within the images provided by the sensing system 312.

The control logic 122 is configured to identify a reference object (e.g., a basketball hoop 371) in the images provided by the sensing system 312 and to reference the gravity-based coordinate system based on the identified object, as shown by block 515 of FIG. 17. In one exemplary embodiment, the control logic 122 is configured to locate a basketball hoop 371 in the images and to define the gravity-based coordinate system such that its origin is at the center of such hoop 371. Notably, the plane of the basketball hoop 371 should be parallel to the PS plane identified by the control logic 122. Since the x-axis and y-axis are defined to be parallel to the PS plane, the x-axis and y-axis should be within the plane of the basketball hoop 371 when the origin is positioned at the center of the hoop 371. In addition, when the origin is so defined, the z-axis passes through the center of the hoop 371 in a direction parallel to gravity.

In order to facilitate installation of the sensing system 312, the sensing system 312 may be mounted at any height above the playing surface 382 and the hoop 371. Without knowing the distance of the hoop 371 from the depth sensor 47, the control logic 122 is configured to analyze a depth map 350 from the depth sensor 47 in order to estimate such distance. Before estimating this distance, the control logic 122 first locates the basketball hoop 371 within such image. Exemplary techniques for identifying the hoop 371 will be described in more detail below.

In one exemplary embodiment, the control logic 122 is configured to identify a pixel set, referred to hereafter as the "basketball goal (BG) pixel set," that does not include the pixels corresponding to playing surface 382, thereby removing a significant number of pixels from the BG pixel set. As an example, the control logic 122 may perform an algorithm similar to the floor differencing algorithm described above on all of the depth pixels of a depth map 350. However, rather than removing the depth pixels that are greater than a threshold (TH) distance from the PS plane, the control logic 122 instead removes the depth pixels that are less than the threshold distance from the PS plane and keeps the depth pixels that are more than the threshold distance from the PS plane.

Figure 15:
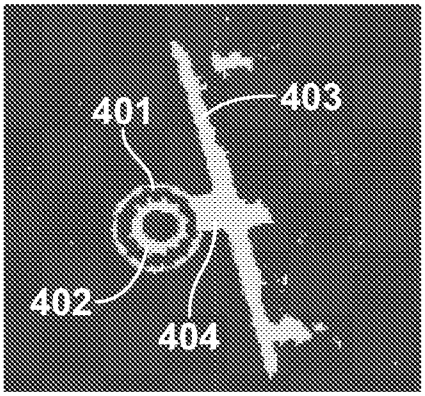
FIG. 15 depicts an exemplary depth map image captured by a depth sensor, such as is depicted by FIG. 11, after depth pixels corresponding to a playing surface plane have been removed.

FIG. 15 shows an exemplary depth map image after floor differencing has been performed in order to remove the depth pixels that correspond to the PS plane. As shown by FIG. 15, the depth map image includes an image 401 of the hoop 371, an image 402 of a net 384 coupled to the hoop 371, an image 403 of the backboard 373 to which the hoop 371 is mounted, and an image 404 of a bracket 383 for coupling the hoop 371 to the backboard 373. From a view above the goal 377, the bracket 383 may appear substantially rectangular, as shown by FIG. 15, although other shapes are possible.

Figure 16:
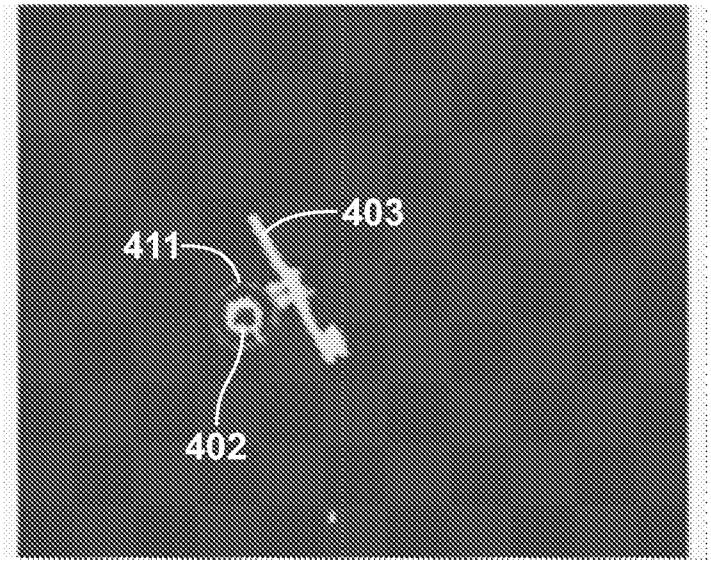
FIG. 16 depicts the exemplary depth map image depicted by FIG. 15 after a hoop template has been superimposed on an image of a hoop.

The control logic 122 searches the depth map image for the image of a circular ring in order to identify the hoop image 401. When the hoop image 401 is found, the control logic 122 determines the size (e.g., diameter) of the hoop image 401. There are various techniques that can be used to determine the size of the hoop image 401. In one exemplary embodiment, the control logic 122 superimposes a scalable hoop template 411 over the hoop image 401, as shown by FIG. 16 (noting that the template 411 is shown in red in FIG. 16). The diameter of the hoop image 411 is adjusted in order to maximize the number of pixels in the hoop image 401 that are covered by the hoop template 411. Since the actual diameter of the hoop 371 is known (about 18 inches for a standard-sized hoop), the distance of the depth sensor 47 from the hoop 371 can be calculated based on the diameter of the template 411.

The hoop diameter in the hoop image 401 may be used by the control logic 122 to calibrate the trajectory calculations to account for the location of the sensing system 312. In this regard, for accurate trajectory calculations, the control logic 122 should be aware of scaling factor to be used to relate distances in an image to the physical distances in the real world. As an example, a distance of half an inch in a captured image may represent a distance of several feet (or some other distance) in the real world. The scaling factor between real-world dimensions and dimensions within the captured images is generally based on several factors, including the location of the sensing system 312 relative to objects appearing in the images, as well as the zoom or magnification of the camera used to capture the image. In one exemplary embodiment, the control logic 122 determines how distances in the captured images correlate or scale with real world distances based on the hoop image 401. In this regard, as described above, the real world diameter of the hoop is typically the same from goal-to-goal (i.e., approximately 18 inches). Thus, based on the diameter of the hoop in the image 401, the control logic 122 can determine the appropriate scaling factor for converting distances in the captured image to real world distances. In other embodiments, other types of objects having known dimensions may be used instead of the hoop. As an example, certain court markings (such as a length of a free throw line) may be known, and images of such court markings may be used to determine the appropriate scaling factor. Also, the distance from the hoop 371 to the playing surface 382 is usually known and can be used as a reference for determining the scaling factor. In other embodiments, yet other types of objects and dimensions may be used to determine the appropriate scaling factor.

In addition, the control logic 122 is also configured to orient the gravity-based coordinate system based on an image of the sensor data 49, as shown by block 517 of FIG. 17. To achieve this in one embodiment, the control logic 122 is configured to identify the image of the bracket 383 in the BG pixel set. As shown by FIG. 15, the region around the hoop image 401 should be substantially devoid of depth pixels as result of the floor differencing described above except for the region where the bracket image 404 is located. Thus, a process for finding the bracket image 404 should be relatively simple and reliable even for brackets 383 of different shapes and configurations. After identifying the bracket image 404, the control logic 122 is configured to orient the axes of the gravity-based coordinate system based on the position of the bracket image 404 relative to the hoop image 401. As an example, the control logic 122 may define one of the axes (e.g., the x-axis) such that it passes through the center of the hoop 371 and the center of the bracket 383.

After orienting the gravity-based coordinate system, the control logic 122 is configured to convert the image data 349 and the depth maps 350 from a format relative to the coordinate system of the camera 351 to a format relative to the gravity-based coordinate system, as shown by block 522 of FIG. 17. Thus, the pixel coordinates for the image data are converted to be relative to the origin of the gravity-based coordinate system rather than the origin of the camera's coordinate system. It should be noted that various changes and modification to FIG. 17 would be apparent to a person of ordinary skill upon reading this disclosure. Moreover, any of the steps of FIG. 17 can be omitted and/or the order of any of the steps may be rearranged as may be desired.

Since the distance of the sensing system 312 from the origin of the gravity-based system is known, the location of any object in the image data 349 relative to the hoop 371 or other object in the playing environment can be calculated. As an example, the trajectory of a basketball can be compared to the location of the hoop 371 in order to determine an angle of entry of the basketball into the hoop. In another example, by knowing the location of the hoop 371 relative to the sensing system 312, the location of a particular court marking within an image, such as a free throw line, can be determined since the marking of a standard basketball court should be a predefined distance and direction from the hoop 371. Thus, it is possible to determine the location of an object relative to the location of the free throw line. For example, the control logic 122 may determine that a player is shooting a free throw based on the player's position, as determined from the image data, relative to the free throw line when he or she launches a basketball toward the hoop 371.

It should be noted that the exemplary processes described above for calibrating the gravity-based coordinate system and converting sensor data 49 into a format relative to the gravity-based coordinate system can be automatically and efficiently performed without any human intervention and without significant processing burdens relative to other techniques that may exist for calibrating coordinate systems. Thus, the process can be repeated as often as may be desired during operation. For example, if the sensing system 312 is struck by a basketball causing the camera 351 and sensor 47 to move, the gravity-based coordinate system can be automatically and quickly re-calibrated according to the techniques described herein.

In addition, in several examples described above, it is assumed that the direction of gravity is perpendicular to the PS plane identified by the control logic 122. However, other directions of gravity relative to the identified PS plane are possible. As an example, certain playing surfaces may be sloped for various reasons, such as for facilitating drainage of water from the surface. For example, a football field often has a “crown” in the middle of the field, and the field slopes downward away from the crown as the sidelines are approached. Thus, portions of the field close to the sideline may be sloped such that the direction of gravity is oblique relative to the surface of the field in the sloped regions. In some cases, the slope of the surface may increase closer to the sideline.

In one exemplary embodiment, the control logic 122 is configured to account for the sloped surface when determining the direction of gravity. Note that there are various techniques that can be used to account for the slope of the surface. As an example, the processing system 46 may store data, referred to herein as “surface data 252” (FIG. 12), indicative of the slope of the playing surface at one or more points. As an example, for each of a plurality of locations on the playing surface, the surface data 252 may have a value indicating a degree to which the surface is sloped, such as a value indicating an angle of the direction of gravity relative to the playing surface at such location. Such data may be predefined and stored in memory 125 prior to normal operation of the processing system 46. As an example, at least one image of the playing surface may be captured with a camera 351 and the depth sensor 47 during a calibration process, and the images may be analyzed by the control logic 122 or otherwise to determine the slope of the playing surface at various locations. In this regard, as described above, depth pixels of depth maps 350 from the depth sensor 47 may be correlated with pixels of image data 349 from the camera 351, and the depths indicated by the depth pixels may be used to calculate the slope of the playing surface at various locations in the images captured by the camera 351. That is, the playing surface is effectively mapped by the control logic 122 in a calibration process so that the slope of the playing surface (relative to gravity) at various locations is indicated by the data 252. In this calibration process, the direction of gravity may be determined based on manual input (e.g., a user may provide an input indicating a direction of gravity within an image) or by finding within an image an object of known orientation, as described above for the basketball hoop. In other embodiments, the sensing system 312 may have sensors, such as accelerometers or other types of sensors that can be used to sense the direction of gravity, as described above.

Figure 18:
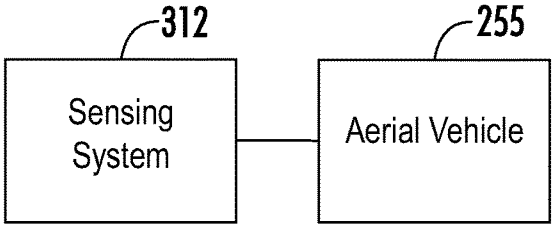
FIG. 18 depicts a sensing system, such as is depicted by FIG. 11, coupled to an aerial vehicle, such as a drone or other aircraft.

In one exemplary embodiment, the sensing system 312 is coupled to an aerial vehicle 255, as shown by FIG. 18, in order to perform the calibration process described above in which the playing surface is mapped to determine its surface topology. As described above, the aerial vehicle 255 may comprise a drone 15 or other type of aircraft that flies above the playing surface allowing the camera 351 and depth sensor 47 to capture images of the playing surface as the vehicle 255 flies. If desired, the vehicle 255 may be coupled to a tether that holds the vehicle 255 in the air and/or guides the vehicle 255 as it moves. In other embodiments, the vehicle 255 may be untethered so that it can freely fly under the direction of a pilot or remote control. In such embodiments, the camera 351 captures images of the playing surface 382 from a location above the playing surface 382, and the depth sensor 47 measures the depth or distance to the playing surface. Each pixel of the images captured by the camera 351 is associated with a depth value indicative of the distance from the surface point represented by the pixel to the sensing system 312. Based on such depth values, the slope of the surface at various locations can be calculated and stored in the surface data 252 for later use in determining the direction of gravity, as described above.

During operation after the calibration process described above, the control logic 122 may be configured to determine a location of the playing surface that is within the image before making a decision regarding the direction of gravity. As an example, for a given depth map 350, the control logic 122 may analyze a corresponding set of image data 349 to determine a relative location of the playing surface within the image defined by this set of image data 349. As an example, based on boundary markings (e.g., sidelines on a football field) within the image, the control logic 122 may determine that a location of the playing surface within the image is close to a sideline where the playing surface is significantly sloped. Based on the surface data 252, the control logic 122 determines the extent of the surface slope at such location and calculates or otherwise determines the direction of gravity based on the slope. Specifically, the control logic 122 accounts for the slope by assigning, based on the surface data 252, a direction of gravity that is at an oblique angle relative to the playing surface at the identified location. Thus, the direction of gravity determined by the logic 122 should be accurate even though the image used by the control logic 122 is of a sloped region of the playing surface.

Note that the sensing system 312 coupled to the aerial vehicle 255 may be used in the manner described above in order to monitor athletes on the playing surface according to the techniques described above. The algorithms described above for determining the direction of gravity based images captured by the camera 351 and the depth sensor 47 may be particularly useful for such an embodiment. In this regard, as the vehicle 255 is flying, the orientation of the sensing system 312 relative to gravity is likely to change frequently and abruptly. The algorithms for determining the direction of gravity based on the camera 351 and depth sensor 47 may be repetitively and frequently performed (such as multiple times per second) while consuming a relatively low amount of processing resources yet providing very accurate estimations of the direction of gravity. Such characteristics may be beneficial in a variety of other applications.

In calculating the trajectory of a moving object, it can generally be assumed that the force exerted on such object by gravity is constant. However, the magnitude of such force generally changes with altitude. As an example, the magnitude of gravitational pull is slightly different for an event occurring in a mountainous region relative to an event occurring close to sea level. In one exemplary embodiment, the processing system 46 is configured to account for variations in altitude in performing the trajectory calculations.

In this regard, the processing system 46 is configured to store gravitational pull data 352 (FIG. 12) indicative of the magnitude of gravitational pull for various altitudes. In addition, during operation, the control logic 122 is configured to determine the approximate altitude of the event being monitored by the processing system 46. As an example, a user may simply enter the altitude of the event via an input device (not shown), such as a keyboard, keypad, or mouse, of the processing system 46, or the processing system 46 may receive such information wirelessly via the wireless communication interface 145. Alternatively, the sensing system 312 may have a sensor (not shown), such as an altimeter or a location sensor (e.g., GPS sensor), that can be used to automatically determine the approximate altitude of at least a component of the system 300 and, therefore, the event at which the system 300 is located. In other embodiments, other techniques for determining altitude are possible.

After determining the altitude, the control logic 122 is configured to consult the gravitational pull data 352 in order to determine the magnitude of gravitational pull to be used for trajectory calculations. As an example, the data 352 may be implemented as a table of altitude values and gravitational pull values, and the control logic 122 may use the altitude value received from the sensing system 312 or otherwise obtained by the control logic 122 as a key for looking up the appropriate gravitational pull value to be used for trajectory calculations. In other embodiments, the control logic 122 may be configured to algorithmically calculate the appropriate gravitational pull value based on the determined altitude. Yet other techniques for determining a suitable gravitational pull value for use in trajectory calculations are possible in other embodiments. By determining the gravitational pull value based the actual altitude of the event being monitored, more accurate trajectory calculations are possible, thereby improving the performance of the system 300.

Various embodiments of monitoring systems are described above in the context of basketball. It should be emphasized that similar techniques may be used in other sports for defining a gravity-based coordinate system and converting sensor data into a format relative to the gravity-based coordinate system. As an example, for football, a sensing system 312 may be positioned such that a goalpost and a surface of a football field are within view. Using techniques similar to those described above for basketball, a surface plane corresponding to the surface of the football field may identified and used to determine the direction of gravity. Further, the shape of the goalpost may be used to orient the gravity-based coordinate system relative to the boundaries and markings of the football field. A goal in hockey may be similarly used to orient a gravity-based coordinate system. Similar techniques may be used in yet other sports to define and orient a gravity-based coordinate system.

Now, therefore, the following is claimed:

1. A system for monitoring player performance at sporting events, comprising:

a drone configured to identify and track a first player on a field or court at a sporting event, the drone configured to operate in a first operational mode and to fly to a first predefined position in the first operational mode for observing a sporting activity performed by the first player at the sporting event, the drone configured to operate in a second operational mode and to fly to a second predefined position in the second operational mode, wherein the drone has at least one sensor for sensing movement of the first player during the sporting activity, wherein the at least one sensor is configured to provide sensor data indicative of the movement, and wherein the drone is configured to observe activity of at least one participant of the sporting event and to transition from the first operational mode to the second operational mode, thereby moving to the second predefined position, in response to an event detected by the drone in the observed activity of the at least one participant; and at least one processor configured to analyze the sensor data to determine a parameter indicative of a performance of the first player in performing the sporting activity; and an output device configured to provide feedback indicative of the performance of the first player based on the parameter, wherein the sporting event includes a first team competing against a second team on the field or court, wherein the first player is on the first team, wherein the event indicates a switch of the first team and the second team between offense and defense, wherein the drone is configured to identify a second player who has entered the court or field at the sporting event in response to the switch between the offense and the defense, and wherein the drone is configured to select the second mode in response to the switch between the offense and the defense based on identification of the second player.

2. The system of claim 1, wherein the drone is a wearable drone worn by the first player.

3. The system of claim 1, wherein the at least one processor resides on the drone.

4. The system of claim 1, wherein the sporting activity includes the first player dribbling or launching a ball or puck.

5. The system of claim 1, wherein the drone is configured to move based on the sensed movement of the first player.

6. The system of claim 1, wherein the first predefined position is relative to the first player.

7. The system of claim 6, wherein the drone is configured to move with the first player during the sporting activity based on the sensed movement of the first player.

8. The system of claim 7, wherein the first predefined position is behind the first player.

9. The system of claim 7, wherein the second predefined position is relative to the second player on the field or the court at the sporting event, and wherein the drone is configured to move with the second player based on sensed movement of the second player in the second operational mode.

10. The system of claim 1, wherein the at least one sensor is configured to capture an image of the first player, wherein the drone is configured to identify the first player based on the captured image, and wherein the drone is configured to identify the first player based on a jersey worn by the first player.

11. The system of claim 1, wherein the at least one sensor is configured to capture an image, wherein the at least one processor is configured to convert the image from a viewpoint relative to a location of the at least one sensor to a viewpoint relative to a location of a head-mounted display, and wherein the at least one processor is configured to transmit the converted image to the head-mounted display.

12. The system of claim 11, further comprising:

a first location sensor positioned on the drone for determining the location of the at least one sensor; and a second location sensor positioned on the head-mounted display for determining the location of the head-mounted display, wherein the at least one processor is configured to convert the image from the viewpoint relative to the location of the at least one sensor to the viewpoint relative to the location of the head-mounted display based on the first location sensor and the second location sensor.

13. The system of claim 1, wherein the at least one sensor is configured to capture a first image, wherein the at least one processor is configured to receive the first image and a second image captured by at least one sensor of a second drone, and wherein the at least one processor is configured to stitch the first image and the second image to form a composite image.

14. The system of claim 1, further comprising a multi-lens camera positioned on the first player, the multi-lens camera having a plurality of lenses, wherein the at least one processor is configured to receive images captured by the multi-lens camera and to stitch the images, thereby providing a composite image.

15. The system of claim 14, wherein the composite image defines a 360 degree view around the first player.

16. A method, comprising:

flying a drone in a first operational mode to a first predefined position for observing a sporting activity performed by a first player at a sporting event, wherein the sporting event includes a first team competing against a second team on a field or court, and wherein the first player is on the first team;

flying the drone in a second operational mode to a second predefined position;

observing, with the drone, activity of at least one participant of the sporting event;

detecting an event in the observed activity of the at least one participant, wherein the event occurs when the first team and the second team switch between offense and defense;

identifying a second player who has entered the court or field at the sporting event in response to the detecting;

selecting the second mode in response to the switch between the offense and the defense based on the identifying;

transitioning from the first operational mode to the second operational mode, thereby causing the drone to fly to the second predefined position, in response to the selecting;

sensing movement of the first player with at least one sensor of the drone during the sporting activity;

receiving sensor data indicative of the movement from the at least one sensor;

determining, based on the sensor data, a parameter indicative of a performance of the first player in performing the sporting activity; and outputting feedback indicative of the performance of the first player based on the parameter.

17. The method of claim 16, further comprising moving the drone based on the sensed movement of the first player.

18. The method of claim 16, further comprising:

wearing the drone by the first player; and releasing the drone from the first player for flight, wherein the flying the drone in the first operational mode to the first predefined position is performed subsequent to the releasing.

19. The method of claim 18, wherein the first predefined position is relative to the first player, and wherein the flying the drone in the first operational mode comprises moving the drone with the first player based on the sensor data.

20. The method of claim 16, wherein the first predefined position is relative to the first player.

21. The method of claim 20, further comprising moving the drone with the first player during the sporting activity based on the sensor data.

22. The method of claim 16, further comprising:

capturing an image with the at least one sensor;

converting the image from a viewpoint relative to a location of the at least one sensor to a viewpoint relative to a location of a head-mounted display; and transmitting the converted image to the head-mounted display.

23. The method of claim 16, further comprising:

capturing a first image with the at least one sensor;

capturing a second image with at least one sensor of a second drone; and stitching the first image and the second image to form a composite image.

24. The method of claim 16, further comprising:

capturing a plurality of images using a multi-lens camera positioned on the first player or the drone; and stitching the plurality of images, thereby defining a composite image.

25. The method of claim 24, wherein the sporting event is a football sporting event, soccer sporting event, or a basketball sporting event.

26. A system for monitoring player performance at sporting events, comprising:

a drone configured to identify and track a first player on a field or court at a sporting event, the drone configured to operate in a first operational mode and to fly to a first predefined position in the first operational mode for observing a sporting activity performed by the first player at the sporting event, the drone configured to operate in a second operational mode and to fly to a second predefined position in the second operational mode, wherein the drone has at least one sensor for sensing movement of the first player during the sporting activity, wherein the drone is configured to move based on the sensed movement of the first player, wherein the at least one sensor is configured to provide sensor data indicative of the movement, and wherein the drone is configured to transition from the first operational mode to the second operational mode, thereby moving to the second predefined position; and at least one processor configured to analyze the sensor data to determine a parameter indicative of a performance of the first player in performing the sporting activity; and an output device configured to provide feedback indicative of the performance of the first player based on the parameter, wherein the sporting event includes a first team competing against a second team on the field or court, wherein the first player is on the first team, wherein the event occurs when the first team and the second team switch between offense and defense, wherein the drone is configured to identify a second player who has entered the court or field at the sporting event in response to the switch between the offense and the defense, and wherein the drone is configured to select the second mode in response to the switch between the offense and the defense based on identification of the second player.

27. The system of claim 26, wherein the first predefined position is relative to the first player.

28. The system of claim 27, wherein the drone is configured to move with the first player during the sporting activity based on the sensed movement of the first player.

29. The system of claim 28, wherein the first predefined position is behind the first player.

30. The system of claim 1, wherein the first predefined position is relative to the first player, and wherein the drone is configured to move based on the sensed movement of the first player in the first operational mode.

31. The system of claim 30, wherein the second predefined position is relative to the second player.

32. The system of claim 31, wherein the at least one sensor is configured to sense movement of the second player in the second operational mode, and wherein the drone, in response to the detected event, is configured to move based on the sensed movement of the second player in the second operational mode.

33. The system of claim 32, wherein the drone is configured to identify the second player in the second operational mode based on a jersey worn by the second player.

34. The system of claim 1, wherein the first predefined position is constant relative to the first player as the first player moves while the drone is operating in the first operational mode.

35. The system of claim 34, wherein the second predefined position is constant relative to the second player as the second player moves while the drone is operating in the second operational mode.

36. The system of claim 35, wherein the second player is on the second team.

37. The system of claim 34, wherein the second predefined position is constant relative to the first player as the first player moves while the drone is operating in the second operational mode.

38. The system of claim 9, wherein the at least one processor is configured to detect, based on the sensor data, a launch of an object by the first player along a first trajectory, evaluate the first trajectory, and provide feedback associated with the first player based evaluation of the first trajectory by the at least one processor.

39. The system of claim 38, wherein the at least one processor is configured to detect, based on the sensor data, a launch of an object by the second player along a second trajectory, evaluate the second trajectory, and provide feedback associated with the second player based on evaluation of the second trajectory by the at least one processor.

* * * * *